(12) United States Patent
Petrocelli

(10) Patent No.: US 10,275,179 B2
(45) Date of Patent: Apr. 30, 2019

(54) DISTRIBUTED VIRTUAL BLOCK STORAGE NETWORK

(71) Applicant: Oracle International Corporation, Redwood Shores, CA (US)

(72) Inventor: Robert Petrocelli, Westerly, RI (US)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 15/407,058

(22) Filed: Jan. 16, 2017

(65) Prior Publication Data

US 2018/0203641 A1    Jul. 19, 2018

(51) Int. Cl.
*G06F 3/06* (2006.01)
*H04L 29/08* (2006.01)

(52) U.S. Cl.
CPC .......... *G06F 3/0659* (2013.01); *G06F 3/0604* (2013.01); *G06F 3/067* (2013.01); *H04L 67/1095* (2013.01)

(58) Field of Classification Search
CPC ...... G06F 3/0659; G06F 3/0604; G06F 3/067; H04L 67/1095
See application file for complete search history.

(56) References Cited

U.S. PATENT DOCUMENTS

| | | |
|---|---|---|
| 6,772,231 B2 | 8/2004 | Reuter et al. |
| 7,051,122 B2 | 5/2006 | Reuter et al. |

(Continued)

FOREIGN PATENT DOCUMENTS

KR    20090102788 A    9/2009

OTHER PUBLICATIONS

Alistair Atkinson, "Tupleware: A Distributed TUple Space for Cluster Computing," 2008, 2008 Ninth International Conference on Parallel and Distributed COmputing, Applications and Technologies, accessed at: https://ieeexplore.ieee.org/stamp/stamp.jsp?tp=&arnumber=4710971&tag=1 (Year: 2008).*

(Continued)

*Primary Examiner* — Reginald G Bragdon
*Assistant Examiner* — Edward Wang
(74) *Attorney, Agent, or Firm* — Kilpatrick Townsend & Stockton, LLP

(57) ABSTRACT

A virtual storage network may be implemented and exposed as a single virtual namespace, using physical disk storage distributed across multiple computing devices. In various embodiments, each computing device contributing physical disk storage to the virtual storage network may include one or more virtual block devices configured to provide a local interface to the virtual storage network, an application programming interface (API) or other software components to translate the local data access requests into tuple-space operations compatible with the tuple-space data model, and/or a tuple-space storage engine configured to provide access to the data tuple-space of the distributed virtual storage network. The tuple-space storage engine executing on each of the computing devices of the virtual storage network may coordinate via low-level communication to satisfy data access requests from client devices, and to perform data replication and migration tasks so that devices may be seamlessly added or removed from the virtual storage network.

20 Claims, 13 Drawing Sheets

(56) References Cited

U.S. PATENT DOCUMENTS

| | | | |
|---|---|---|---|
| 7,633,955 | B1 | 12/2009 | Saraiya et al. |
| 7,711,789 | B1 | 5/2010 | Jnagal et al. |
| 8,285,927 | B2 * | 10/2012 | Flynn .................... G06F 3/0613 711/113 |
| 8,533,256 | B2 | 9/2013 | Baptist et al. |
| RE44,818 | E | 3/2014 | Jnagal et al. |
| 8,848,727 | B2 | 9/2014 | Pratap et al. |
| 8,892,698 | B2 | 11/2014 | Baptist et al. |
| 9,519,594 | B2 | 12/2016 | Flynn et al. |
| 9,852,137 | B2 | 12/2017 | Mann et al. |
| 2002/0019863 | A1 | 2/2002 | Reuter et al. |
| 2005/0055468 | A1 | 3/2005 | Reuter et al. |
| 2009/0019258 | A1 * | 1/2009 | Shi ...................... G06F 11/2028 712/29 |
| 2010/0169391 | A1 | 1/2010 | Serino et al. |
| 2011/0010427 | A1 | 1/2011 | Jnagal et al. |
| 2013/0117621 | A1 | 5/2013 | Saraiya et al. |
| 2014/0012899 | A1 | 1/2014 | Baptist et al. |
| 2017/0083541 | A1 | 3/2017 | Mann et al. |

OTHER PUBLICATIONS

Abualkibash, et al., "Cloud Computing: the Future of IT Industry", International Journal of Distributed and Parallel Systems (IJDPS) vol. 3, No. 4, Jul. 2012, 13 pages.

Arif, et al., "Virtualization Security: Analysis and Open Challenges", International Journal of Hybrid Information Technology, vol. 8, No. 2, Feb. 2015, 11 pages.

Innocent; A. Anasuya Threse, "Cloud Infrastructure Service Management—A Review", IJCSI International Journal of Computer Science Issues, vol. 9, Issue 2, No. 2, Mar. 2012, 7 pages.

Hu; Bin, et al., "A General Architecture for Monitoring Data Storage with OpenStack Cloud Storage and RDBMS", Proceedings of the 2nd International Symposium on Computer, Communication, Control and Automation (ISCCCA-13), Jan. 2013. 4 pages.

Jararweh, et al., "CloudExp: A Comprehensive Cloud Computing Experimental Framework", Simulation Modelling Practice and Theory, Oct. 2014, 14 pages.

Pal, et al., "A Virtualization Model for Cloud Computing" Proc. of International Conference on Advances in Computer Science 2012, ACEEE, DOI: 02.AETACS.2012.3., 7 pages.

Vosoogh, et al., "Integral Criterion-Based Adaptation Control to Vibration Reduction in Sensitive Actuators", International Journal of Hybrid Information Technology, vol. 8, No. 2, Feb. 2015.

Sedayo, et al., "Open Data Center Alliance Master Usage Model: Scale-Out Storage Rev. 1.0", 2013 16 pages.

Talib, et al. "Security Framework of Cloud Data Storage Based on Multi Agent System Architecture: Semantic Literature Review." Computer and Information Science, vol. 3, No. 4; Nov. 2010. 12 pages.

Xiong, et al., "Novel ITS based on Space-Air-Ground collected big-data", 2014 IEEE 17th International Conference on Intelligent Transportation Systems (ITSC) Oct. 8-11, 2014, 7 pages.

Zeng, et al., "Research on cloud storage architecture and key technologies", Computer Sciences and Convergence Information Technology, Nov. 2009, all pages.

\* cited by examiner

DISTRIBUTED VIRTUAL BLOCK STORAGE NETWORK

FIELD

The present disclosure generally relates to storage systems, and more specifically to a virtual block storage network implemented using a tuple-space data model which is distributed across the physical storage disks of multiple computing devices.

BACKGROUND

Access to remote data storage is often provided using storage area networks (SANs) and related technologies. A SAN may expose the data from one or more back-end physical storage devices, using specialized protocols that the remote storage devices to data consumers operating (e.g., servers or workstations). Some designs may require specialized computing devices which act as data servers (targets), and specialized client software (initiators) configured to deliver the data over computer networks.

In certain systems, a low level disk command set, such as small computer system interface (SCSI), is encapsulated over a delivery network, such as an Ethernet or fiber-channel network. In such systems, the back-end storage (target) may consist of one or more computer servers housing magnetic or solid state storage devices. The back-end storage devices may be managed using specialized software, such as a volume manager, which may provide an abstraction layer and data protection services, such as redundant array of independent disks (RAID). In these examples, and other conventional storage systems, such implementations may require expensive and specialized storage hardware and software.

BRIEF SUMMARY

Various techniques described herein relate to implementing virtual block storage networks using a tuple-space data model and physical storage distributed across multiple computing devices. The virtual storage network may be implemented and exposed as a single virtual namespace, while the physical disk storage of the virtual block storage network may be distributed across multiple computing devices. In various embodiments, each computing device contributing physical disk storage to the virtual storage network may include one or more virtual block devices configured to provide a local interface to the virtual storage network, an application programming interface (API) or other software components to translate the local data access requests into tuple-space operations compatible with the tuple-space data model, and/or a tuple-space storage engine configured to provide access to the data tuple-space of the distributed virtual storage network. The tuple-space storage engine executing on each of the computing devices of the virtual storage network may coordinate via low-level communication to satisfy data access requests from client devices (e.g., reads, writes, copies, deletions, etc.), and to perform data replication and migration tasks so that devices may be seamlessly added or removed from the virtual storage network.

In certain embodiments described herein, each of one or more computing devices within a distributed storage system may include a physical computer storage, a virtual block device, a processing unit, and memory. Each said computing device may be configured to execute a software service configured to provide access to a distributed data tuple-space (e.g., a tuple-space storage engine), in which a portion of the distributed data tuple-space is stored within the physical computer storage of the local computing device and additional portions of the distributed data tuple-space are stored in remote computing devices. The computing devices of the distributed storage system may be further configured to receive data access requests using the virtual block device, and determine, based on data identifiers within the requests, whether requested data is accessible via the distributed data tuple-space or is accessible via separate storage systems of the local computing device. For requests to access data within the distributed data tuple-space, the computing devices may use software components to translate the requests into tuple-space operations compatible with the distributed data tuple-space, and execute the tuple-space operations using the software service. In certain embodiments, executing the tuple-space operations may include determining whether the requested data to be accessed (e.g., read, written, copied, deleted, etc.) is stored within the local computing device, and/or is stored within one or more remote computing devices. When determining that the data is stored (or will be stored) locally, the software service may access the data from the local physical computer storage, and when determining that the data is stored (or will be stored) remotely, the software service may transmit requests to corresponding software services of the remote devices to access the data.

In some embodiments, data within the distributed data tuple-space may be stored at a single location (e.g., within only one computing device) or at multiple locations/nodes within the tuple-space. Similar or identical software service instances (e.g., instances of the tuple-space storage engine) may execute on each computing device within the distributed data tuple-space, and may coordinate via low-level messages to handle adding or removing nodes from the tuple-space, data replication, data migration, and data integrity, etc. Such software service instances may be similar or identical, even in cases when the node devices of the tuple-space (e.g., the computing devices contributing storage to the virtual storage network) have different disk sector formats. Additionally, the interface provided by the virtual block devices may be local file system interfaces, so that the data access request may be similar or identical to data access requests via the local file system.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
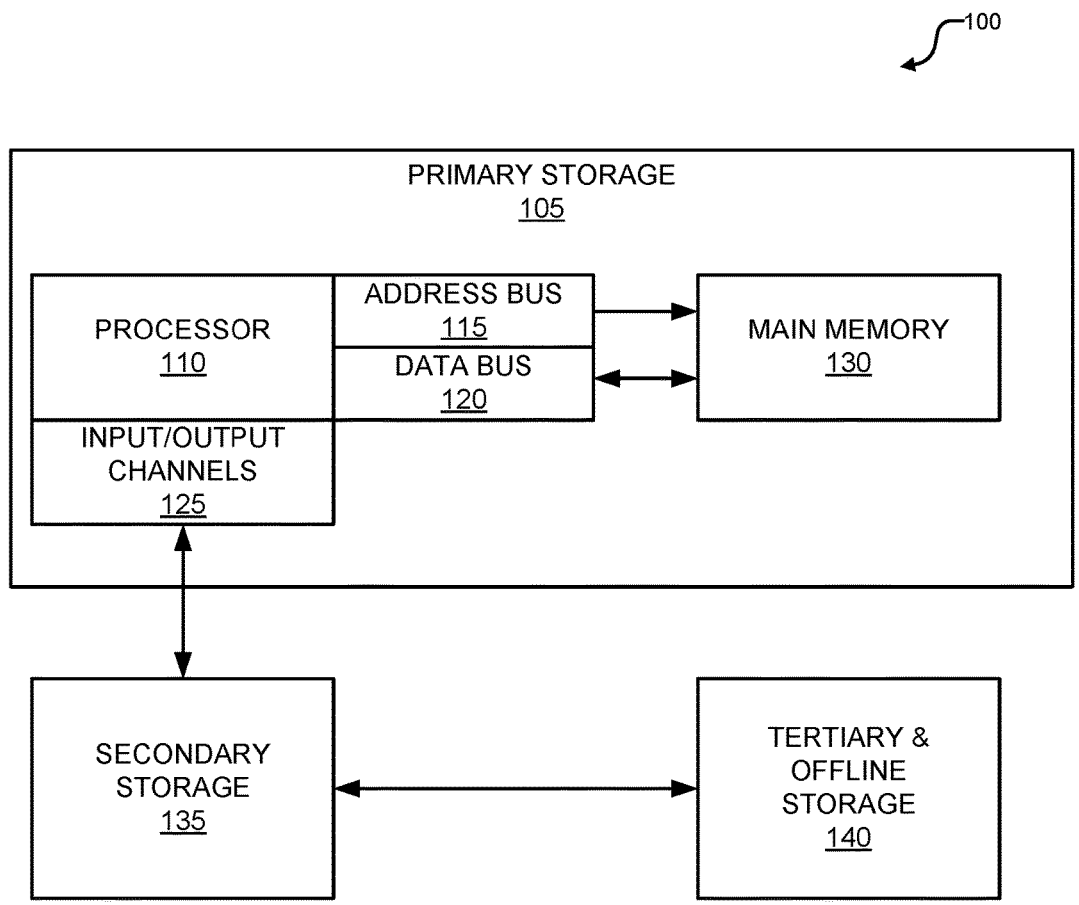
FIG. 1 is a block diagram illustrating a data storage system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Data Storage Systems

Data storage systems may include any separate or combined storage devices and/or components that are used to retain, and in some cases process, data. Without data storage systems, computing devices would be limited to the performance of certain operations and would have to immediately output the result. The use of data storage systems may allow computing devices to perform a wider range of operations, store and reference the results of performed operations (either short-term or long-term), and store and execute specialty applications for a variety of purposes. As used herein, a "storage device" may be any component or combination of components used to retain data in a data storage system.

FIG. 1 is a block diagram illustrating a data storage system 100, in accordance with some embodiments. The data storage system 100 may be included, in whole or in part, in one or more computing devices, such as personal computers (e.g., clients) or servers (e.g., hosts). The data storage system 100 may include primary storage 105, secondary storage 135, and tertiary & offline storage 140. Although shown and described as including these three different types of storage, it is contemplated that the data storage system 100 may implement more or less different types of storage, either separately or in combination. Further, although shown and described as including one of each of these different types of storage, it is contemplated that none or more than one of the different types of storage may be included. For example, in some embodiments, more than one storage device may be included in secondary storage 135.

Primary storage 105 may include a processor 110 (or more than one processor 110) and main memory 130. The processor 110 may be or include, for example, a central processing unit (CPU). The processor 110 may retrieve and manipulate data stored in the data storage system 100. Thus, in general, data stored in the data storage system 100 in close proximity to the processor 110 may be retrieved and processed fastest, while data stored in the data storage system 100 further from the processor 110 may be processed slower. However, frequently, some configurations can result in only a small amount of data being available to be stored in close proximity to the processor 110 (and in some embodiments, only temporarily), while larger storage options may generally be positioned further from the processor 110 (and may be used to permanently store data).

The processor 110 may include its own memory (not shown). The memory of processor 110 may include one or more processor registers and one or more processor caches. The processor registers may hold a small discrete amount of data (e.g., 8, 32 or 64 bits). The processor registers may take on any of a number of forms. For example, the processor registers may include one or more data registers. The processor 110 may load data from larger storage in the data storage system 100 (e.g., main memory 130) into the data registers to perform operations or manipulations on the data. The data may then be stored back to the larger storage (e.g., main memory 130). In another example, the processor registers may include one or more address registers. The address registers may hold addresses for data that may be requested by executed instructions. In still another example, the processor registers may include one or more general purpose registers. The general purpose registers may be combination registers that may store data and/or addresses. Other types of registers that may be alternatively or additionally included in the processor registers include floating point registers, status registers, constant registers, vector registers, special purpose registers, machine specific registers, internal registers, and the like. The processor registers may be the fastest type of storage available in the data storage system 100 due to its location inside the processor 110, but may be limited by a small amount of data.

The processor 110 may also include one or more processor caches. The processor caches may include one or more data caches. The data caches may store data that is frequently used. The processor caches may alternatively or additionally include one or more instruction caches. The instruction caches may store executable instructions that are frequently used. The processor caches may alternatively or additionally include a translation lookaside buffer. The translation lookaside buffer may be used to expedite virtual-to-physical address translation for executable instructions and data. Although the processor caches are also located inside the processor 110, they may be slower than the processor registers. However, the processor caches may be preferable over the main memory 130 for storage of actively or commonly used data or instructions in small amounts, as the processor caches may be accessed faster than the main memory 130.

The processor 110 may be directly or indirectly coupled to the main memory 130 over an address bus 115 and a data bus 120. When requesting certain data from the main memory 130, the processor 110 may send a memory address to the main memory 130 over the address bus 115. The memory address may indicate the location of the data being requested. The processor 110 may then read the data from the main memory 130 over the data bus 120. The processor 110 may alternatively or additionally write data to the main memory 130 over the data bus 120.

The main memory 130 may include, for example, random access memory (RAM), such as dynamic RAM (DRAM), static RAM (SRAM), synchronous DRAM (SDRAM), or any other type of volatile storage. "Volatile" storage, as used herein, may refer to a characteristic of storage devices that do not retain their contents when not supplied with power and thus are uninitialized upon booting up (e.g., temporary storage). In other words, volatile storage may require a constant source of power to retain stored data. Although the main memory 130 may be volatile, access to data stored therein is generally faster than that stored in secondary storage 135 or tertiary & offline storage 140 due to its close proximity to the processor 110. In some embodiments, the primary storage 105 may also include non-volatile storage, such as read only memory (ROM).

The processor 110 may use input/output channels 125 to access the secondary storage 135. The secondary storage 135 may include, for example, hard disk drives, flash memory, or any other type of non-volatile storage. "Non-volatile" storage, as used herein, may refer to a characteristic of storage devices that retain their contents when powered down, and data may be stored therein temporarily or permanently. The secondary storage 135 may have one or more file systems stored thereon that may provide a hierarchy of files and directories stored in the secondary storage 135, as described further herein with respect to FIG. 3. In some embodiments, the secondary storage 135 may also include volatile storage, such as RAM disks.

In some embodiments, the primary storage 105 is collocated with the secondary storage 135, e.g., on a single computing device. However, it is contemplated that in some embodiments, the primary storage 105 may be located remotely from the secondary storage 135, e.g., on two or more different computing devices. For example, the secondary storage 135 may be located at a host, while the primary storage 105 may be located at a client. The client may issue commands to retrieve and access data stored on the secondary storage 135 at the host using the processor 110 of the primary storage 105 at the client.

Tertiary & offline storage 140 may include tertiary storage, such as removable mass storage media used to store large amounts of data that is not accessed often, but may be accessed without human intervention using robotic technologies. Tertiary & offline storage 140 may alternatively or additionally include offline storage, such as removable storage media that may not be accessed without human intervention, such as CD-ROMs, CD-RWs, DVDs, floppy disks, Universal Serial Bus (USB) flash drives, and the like. Offline storage may be recorded and physically disconnected from the data storage system 100. Although shown as being in communication with the secondary storage 135, it is contemplated that the tertiary & offline storage 140 may alternatively or additionally be in direct communication with the primary storage 105.

File Systems

Figure 2:
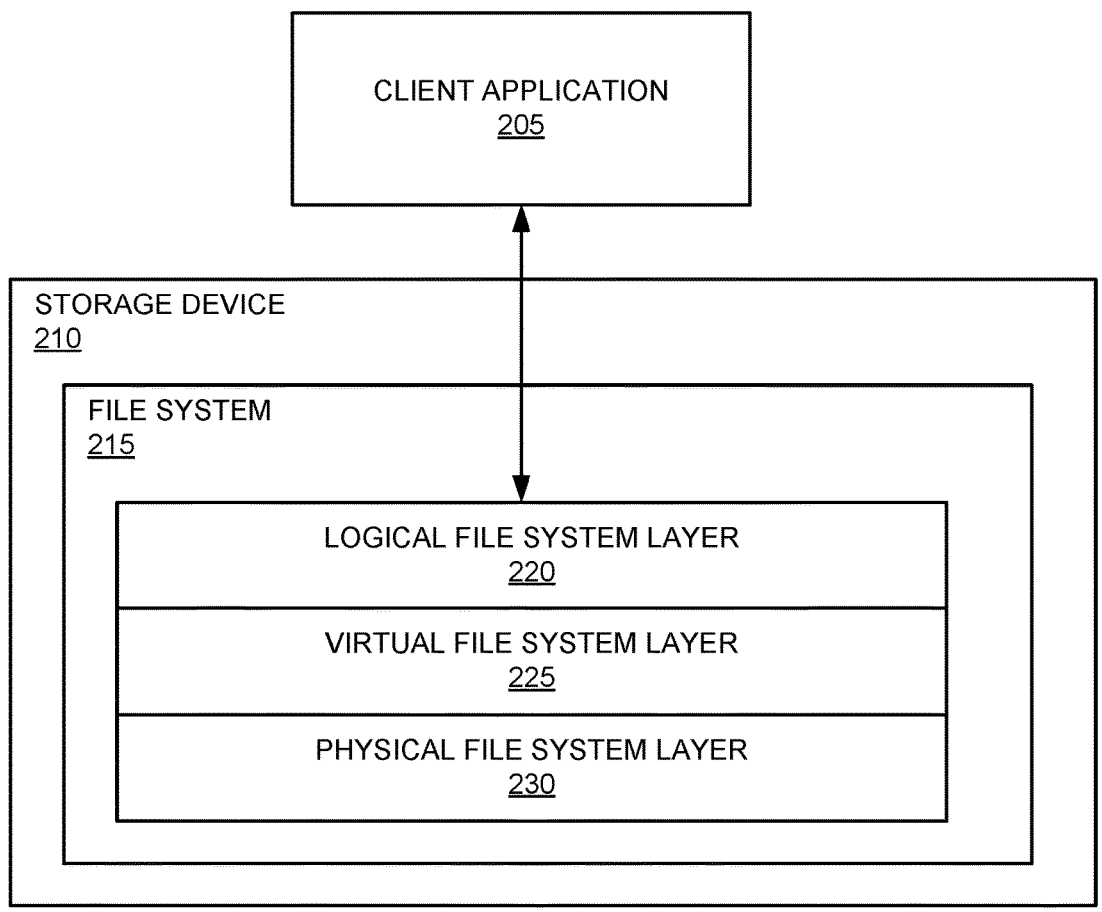
FIG. 2 is a block diagram illustrating the layers of a file system of a storage device, in accordance with some embodiments.
Figure 3:
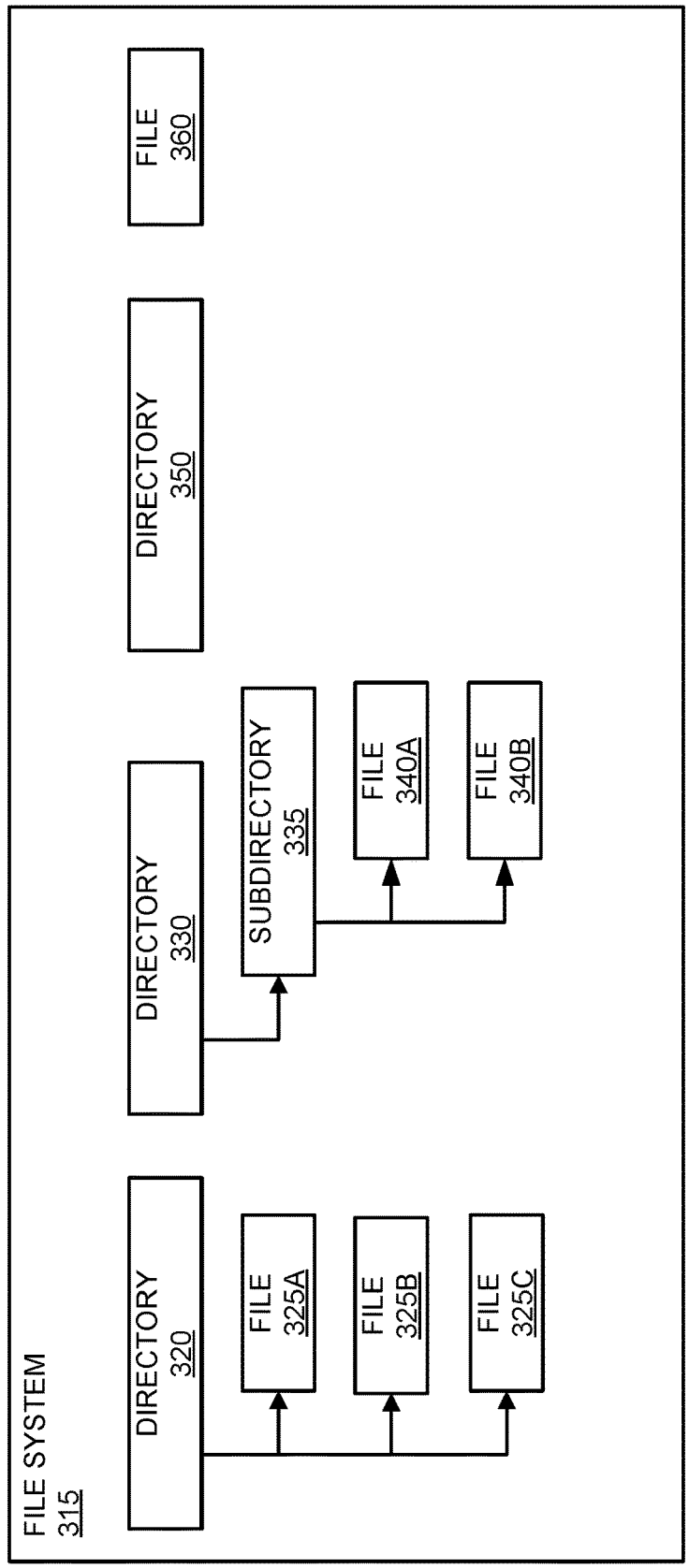
FIG. 3 is a block diagram illustrating a hierarchy for data stored or mounted in a file system, in accordance with some embodiments.

A storage device of a data storage system may implement one or more file systems to organize the data stored thereon. As used herein, a "file system" may refer to a structure or organization of files or directories, and a "file" may refer to a group of data. Each file may be associated with a filename that allows that file to be uniquely identified and located. A number of different file systems may be used depending on the specific requirements and desired applications. FIGS. 2 and 3 illustrate exemplary file systems that may be implemented on a storage device.

FIG. 2 is a block diagram illustrating the layers of a file system 215 of a storage device 210, in accordance with some embodiments. The file system 215 may have three layers: a logical file system layer 220, a virtual file system layer 225, and a physical file system layer 230. Although shown and described as having these three layers, it is contemplated that fewer or more layers may be used. For example, in some embodiments, the functions of the logical file system layer 220, the virtual file system layer 225, and the physical file system layer 230 may be combined into a single layer. In some embodiments, the virtual file system layer 225 may be omitted.

The logical file system layer 220 may interact with the client application 205 to process requests for data. The logical file system layer 220 may provide the application programming interface (API) for file access and operations (e.g., open, close, read, write, etc.). The logical file system layer 220 may receive the requested operation and may pass it to the virtual file system layer 225 to be passed to the physical file system layer 230.

The logical file system layer 220 may provide a consistent view of multiple physical file systems that may be defined by multiple file system implementations. This consistency may be provided by the abstraction of the physical file system layer 230 that is implemented by the virtual file system layer 225. The abstraction may specify a set of operations that a given implementation should include in order to carry out file system requests received through the logical file system layer 220. Thus, the abstraction carried out by the virtual file system layer 225 may provide a uniform interface to the logical file system layer 220.

In other words, the virtual file system layer 225 may provide support for multiple different physical file systems. The virtual file system layer 225 may allow the client application 205 to access different types of file systems in a uniform way. For example, the virtual file system layer 225 may allow the client application 205 to access file systems on both local storage devices and network storage devices, file systems for different operating systems (e.g., Windows, Mac OS, Unix, etc.), file systems of different types (e.g., Unix file system (UFS), network file system (NFS), etc.), and the like.

The physical file system layer 230 may process the requested operation on a file (e.g., read, write, etc.). The physical file system layer 230 may physically place files in specific locations on the storage device 210. The physical file system layer 230 may interact with the drivers of the storage device 210 to physically operate the storage device 210.

FIG. 3 is a block diagram illustrating a hierarchy for data stored or mounted in a file system 315, in accordance with some embodiments. In some embodiments, data may be physically stored in the file system 315 according to the hierarchy shown in FIG. 3, such as in a Windows operating system (using file systems such as, e.g., FAT, NTFS, exFAT, Live File System, ReFS file system, etc.). In some embodiments, data may instead be physically stored under a single root directory. The file system 315 may be "mounted" by informing the operating system where in the hierarchy certain files should appear. These embodiments may be implemented in a Unix or Unix-like operating system.

The file system 315 may include one or more directories (e.g., directories 320, 330, 350), one or more subdirectories (e.g., subdirectory 335), and one or more files (e.g., files 325A-C, 340A-B, 360). Directories (which may also be referred to herein as "folders") may group files into separate collections. For example, directory 320 may include files 325A-C. Directories may also include subdirectories. For example, directory 330 may include subdirectory 335, and subdirectory 335 may include files 340A-B. Directories may also be created without any files (e.g., directory 350). Files may also be located in the file system 315 without an associated directory (e.g., file 360).

File (e.g., files 325A-C, 340A-B, 360) within the file system 315 may have associated metadata. The metadata may be stored separately from the file (not shown). The metadata may include, for example, the amount of data in the file, a file timestamp (e.g., the last time the file was modified, when the file was created, the time the file was last backed up, and/or when the file was last accessed), a user ID, access permissions, file attributes (e.g., read only, read/write, etc.), and the like.

Network Devices

Figure 4:
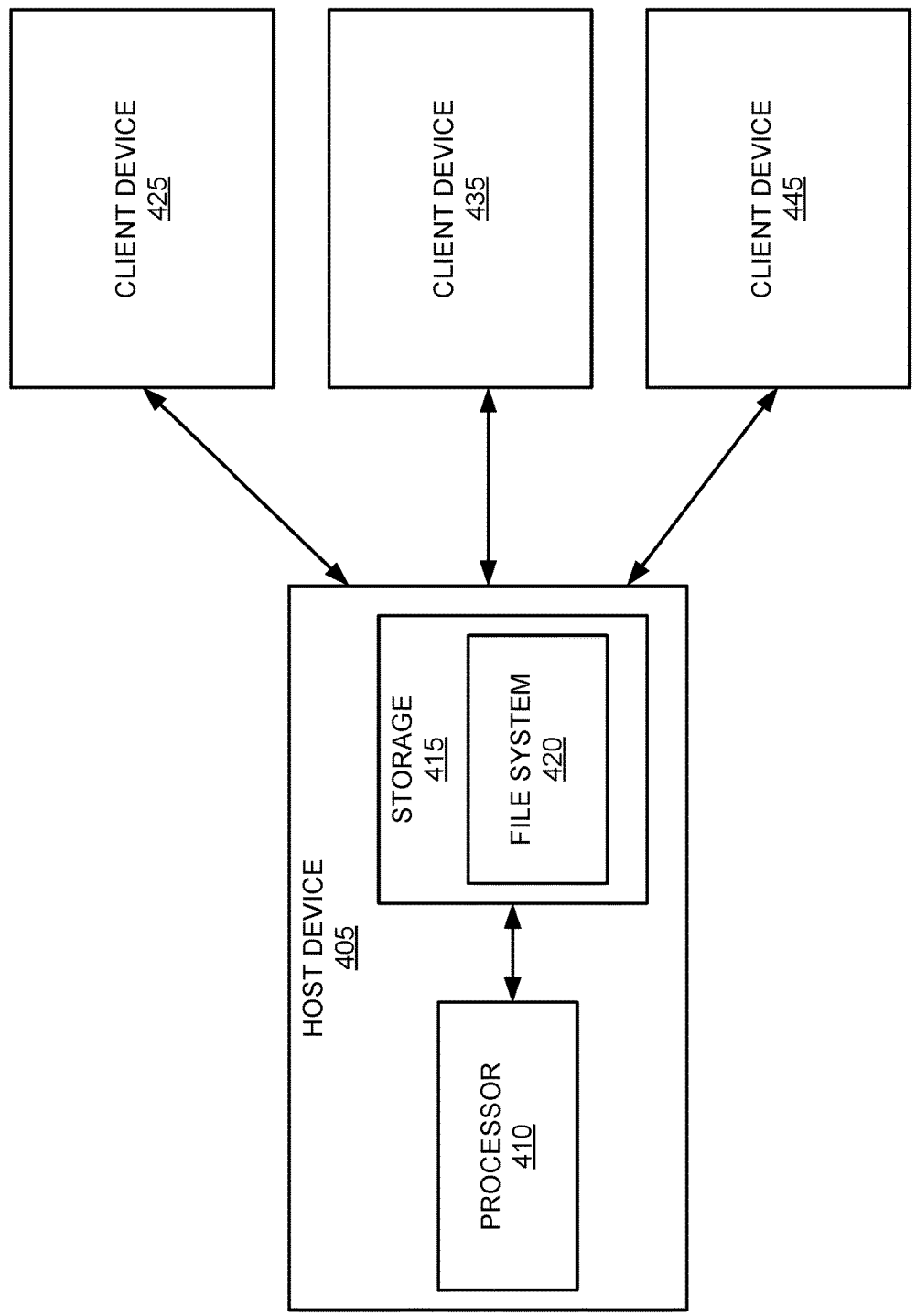
FIG. 4 is a block diagram illustrating a host device in a network, in accordance with some embodiments.

Data storage systems may be implemented as network devices accessible by client devices over a network. FIG. 4 is a block diagram illustrating a host device 405 in a network, in accordance with some embodiments. The host device 405 may be a host storage device, host computing device (e.g., a host server), and/or host data storage system. The host device 405 may include a processor 410 and storage 415. The processor 410 may be similar to the processor 110 of FIG. 1. The storage 415 may include primary storage 105, secondary storage 135, and/or tertiary & offline storage 140 of FIG. 1. The storage 415 may include a file system 420, which may be similar to file system 215 of FIG. 2 and/or file system 315 of FIG. 3. As discussed herein with respect to FIG. 1, it is contemplated that in some embodiments, processor 410 of host device 405 is not necessary, and respective processors of client devices 425, 435, 445 may be used to process requests for data from host device 405.

The host device 405 may communicate over a network with the client devices 425, 435, 445. The host device 405 may communicate with the client devices 425, 435, 445 through any standard data connection, including but not limited to an Internet connection. This may include a wireless channel (e.g., a Wi-Fi connection), a wired connection (e.g., DSL, cable modem, etc.), or a combination of both. The client devices 425, 435, 445 may utilize the host device 405 to store data, define rules, set permissions, and the like. The host device 405 may also be in communication with one or more user devices (not shown). The user devices may utilize the host device 405 to request and/or use data. In addition, although shown and described as being in communication with three client devices 425, 435, 445, it is contemplated that host device 405 may be in communication with any number of client devices in this embodiment.

The host device 405 may store data that may be requested by and transmitted to the client devices 425, 435, 445 for any purpose. In these embodiments, data that may be requested from the host device 405 may be referred to as a "share", i.e., a resource that may be made available by one device to other devices. For example, the client devices 425, 435, 445 may be requesting an application or service. In another example, the host device 405 may be performing migration of one or more files, file systems, and/or databases to one or more of client devices 425, 435, 445.

Distributed Virtual Block Storage Network

As discussed below in detail, various techniques (e.g., systems, methods, computer-program products tangibly embodied in a non-transitory computer-readable storage medium, etc.) are described herein for implementing virtual block storage networks using a tuple-space data model and physical storage distributed across multiple computing devices. The virtual storage network may be implemented and exposed as a single virtual namespace, while the physical disk storage of the virtual block storage network may be distributed across multiple computing devices. In various embodiments, each computing device contributing physical disk storage to the virtual storage network may include one or more virtual block devices configured to provide a local interface to the virtual storage network, an application programming interface (API) or other software components to translate the local data access requests into tuple-space operations compatible with the tuple-space data model, and/or a tuple-space storage engine configured to provide access to the data tuple-space of the distributed virtual storage network. The tuple-space storage engine executing on each of the computing devices of the virtual storage network may coordinate via low-level communication to satisfy data access requests from client devices (e.g., reads, writes, copies, deletions, etc.), and to perform data replication and migration tasks so that devices may be seamlessly added or removed from the virtual storage network.

In some embodiments, each of the computing devices within a distributed storage system may include a physical computer storage, a virtual block device, a processing unit, and memory. Each computing device may be configured to execute a software service configured to provide access to a distributed data tuple-space (e.g., a tuple-space storage engine), in which a portion of the distributed data tuple-space is stored within the physical computer storage of the local computing device and additional portions of the distributed data tuple-space are stored in remote computing devices. The computing devices of the distributed storage system may be further configured to receive data access requests using the virtual block device, and determine, based on data identifiers within the requests, whether requested data is accessible via the distributed data tuple-space or is accessible via separate storage systems of the local computing device. For requests to access data within the distributed data tuple-space, the computing devices may use software components to translate the requests into tuple-space operations compatible with the distributed data tuple-space, and execute the tuple-space operations using the software service. In certain embodiments, executing the tuple-space operations may include determining whether the requested data to be accessed (e.g., read, written, copied, deleted, etc.) is stored within the local computing device, and/or is stored within one or more remote computing devices. When determining that the data is stored (or will be stored) locally, the software service may access the data from the local physical computer storage, and when determining that the data is stored (or will be stored) remotely, the software service may transmit requests to corresponding software services of the remote devices to access the data.

In various embodiments, data within the distributed data tuple-space may be stored at a single location (e.g., within only one computing device) or at multiple locations/nodes within the tuple-space. Similar or identical software service instances (e.g., instances of the tuple-space storage engine) may execute on each computing device within the distributed data tuple-space, and may coordinate via low-level messages to handle adding or removing nodes from the tuple-space, data replication, data migration, and data integrity, etc. Such software service instances may be similar or identical even in cases when the node devices of the tuple-space (e.g., the computing devices contributing storage to the virtual storage network) have different disk sector formats. Additionally, the interface provided by the virtual block devices may be local file system interfaces, so that the data access request may be similar or identical to data access requests via the local file system.

Thus, aspects of the present disclosure may impact several potential advantages in comparison with conventional storage area networks (SANs) and other storage systems. For instance, the use of device drivers (e.g., via the virtual block devices) and data management software components (e.g., via the tuple-space storage engine) may reduce or eliminate the need for a front end data transmission network. Instead, the virtual storage networks described herein, which may be created from cluster of computing devices, may allow the device drivers to communicate directly with the scale-out storage layer of the virtual storage network using a low-level application programming interface (API), which may provide low latency access to the data tuple-space. The combination of the tuple-space storage engine, and scale-out distribution of physical storage across multiple computing devices, may provide direct access to virtual devices using a driver and/or API, rather than requiring an initiator. Further, certain virtual storage networks described herein may be integrated directly into client computing environments, without the need for specialized storage servers, specialized networked storage software, or front end networks.

Moreover, the techniques described herein may provide additional benefits with respect to both engineered storage systems and end-user experience of such systems. In certain embodiments, by combining a software scale-out storage layer with additional computing technologies (e.g., servers and applications versus dedicated SAN storage environments) may allow general computing devices to be used as distributed system building blocks. Such approaches may reduce the need for centralized and expensive storage hardware. Additionally, end users may scale workloads by adding additional computing devices which may increase both the capacity and the performance of the virtual storage network. Service also may be simplified, as computing devices may be added and removed while the computing environment is live. Further, portability and scalability of virtual storage networks may enhanced by nature of modeling and managing data using a tuple-space data model and the tuple-space storage engine. For example, data migrations within certain embodiments described herein may be accomplished using simple software commands, rather than requiring the generation and execution of custom code.

Figure 5:
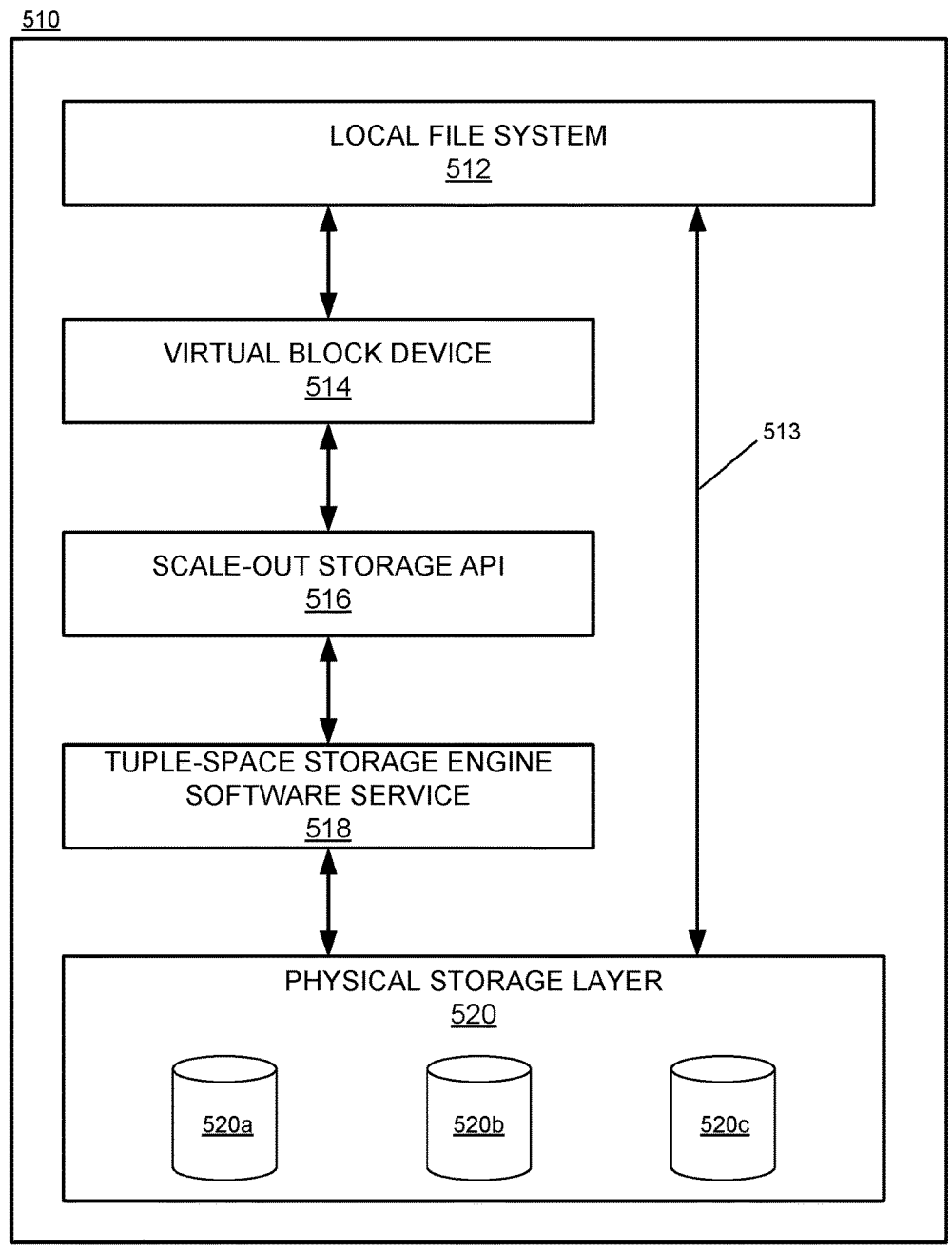
FIG. 5 is a block diagram illustrating an example computer architecture of a computing device within a distributed virtual block storage network, in accordance with one or more embodiments of the disclosure.

Referring now to FIG. 5, a block diagram is shown illustrating an example of a computer architecture of a computing device within a distributed virtual block storage network. As shown in this example, computing device 510 may include a physical storage layer 520 including one or more physical storage disks, as well as various specialized hardware and/or software components including a local file system 512, virtual block device 514, scale-out storage application programming interface (API) 516, and tuple-space storage engine software service 518. As discussed below in more detail, various types of computing devices 510, including both servers and/or personal computers, may have components 512-520 installed and configured to allow the computing devices 510 to serve as nodes and client devices within a virtual block storage network. As discussed in more detail below, multiple computing devices 510 may be connected as a plurality of nodes (e.g., a cluster), and each node may contribute at least a portion of its local or direct-attached storage 520 to a single virtual storage "namespace."

Further, as discussed below, the data within the virtual block storage network may be stored in accordance with a tuple-space data model. In such cases, computing device 510 may include a tuple-space storage engine 518 configured to provide direct access to the data tuple-space within the physical storage layer 520. The tuple-space storage engine 518 may be implemented as a local storage software service of the virtual storage network, and may execute tuple-space operations to access the data tuple-space within the physical storage layer 520 to perform data reads, writes, deletes, copies, etc. Additionally, in this example, the computing devices may include a virtual block device 514 configured to provide a local interface through which the data tuple-space of the virtual storage network may be accessed. As shown in this example, the virtual block device may include one or more block device drivers which present an interface through the local file system 512 of the computing device 510. Thus, access to the virtual storage network may be provided to end users (e.g., individual users, local applications, remote servers, etc.) via the local file system 512 in the same manner that such users may access other data stored in the physical storage 520 of the computing device 510. In some cases, the virtual storage network may be entirely transparent to end users, so that end users accessing the storage of the computing device 510 via the local file system 512 need not have any knowledge of whether they are accessing a local storage system (e.g., via arrow 513) or the distributed data tuple-space of the virtual storage network. Finally, a scale-out storage API 516 and/or other software components may translate data access requests received via the virtual block device 514 into tuple-space operations for the tuple-space storage engine 518.

In order to perform these features and other functionality described herein, computing device 510 may correspond to a general or specialized computer server, such as a primary storage server 105 within a data storage system 100, and/or a storage device 210 implemented with file system storage layers, as discussed above in reference to FIGS. 1-3. However, in other embodiments, computing device 510 need not correspond to a specialized computer server, but may be implemented on any number of general-purpose or specialized computing devices, including, by way of example, personal computers, laptop computers, workstation computers, gaming consoles, and/or mobile devices (e.g., smartphones, tablet computers, wearable computers, vehicle-based computing systems, etc.). Further, each of components and subcomponents of the computing device 510 may be implemented in hardware, software, or a combination thereof.

Figure 6:
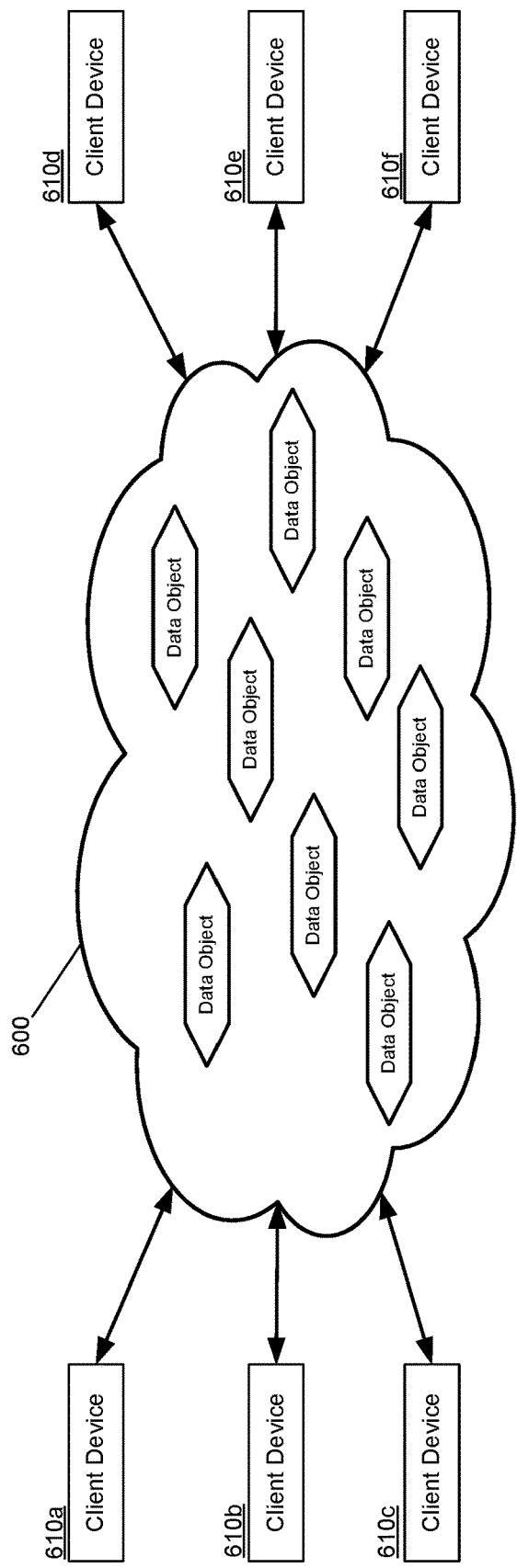
FIG. 6 is a diagram illustrating a data tuple-space accessible to a plurality of client devices, in accordance with one or more embodiments of the disclosure.

Referring now to FIG. 6, a diagram is shown illustrating a data tuple-space accessible to a plurality of client devices 610. As noted above, in some embodiments, the data within the virtual block storage networks described herein may be stored using a tuple-space data model. In this example, a data tuple-space 600 is shown containing a number of data records accessible to a plurality of client devices 610a-620a. As used herein, a tuple space (also referred to herein as a data tuple-space) may refer to a data repository used to store and access data objects (or tuples). In some embodiments, the tuples of a data tuple-space may be accessed concurrently by multiple different client device 610. Tuple spaces 600 may be implemented using associative memory, and thus may be content-searchable using pattern matching data retrieval techniques. The tuples within tuple space 600 may persist until they are retrieved and deleted by an application/process executing on a client device 610. Multiple client devices 610 may interact with the tuple spaces 600 concurrently, to insert new tuples, retrieve existing tuples, copy tuples, and/or delete tuples.

The data objects (or tuples) within tuple space 600 may refer to any set or list of elements, such as the elements within the rows and columns of a relational database. Tuples may consist of one or more ordered elements, and each element within a tuple may be composed of field and value pairs. For instance, a single tuple may store the following data: [field 1, value 1, field 2, value 2, field 3, value 3, . . . ]. The field may correspond to the data type of the value, such as an integer, floating point value, string, boolean value, etc.). In various examples, tuple space 600 may support one or more types of tuple-space operations that may be used by client applications/processes to access the data objects within the tuple space 600. For example, an illustrative implementation of tuple space 600 may support at least the following tuple-space operations: (1) an "out" operation used to store a new tuple in the tuple space 600; (2) an "in" operation used to retrieve and permanently remove a tuple from the tuple space 600, based on one or more search patterns provided as parameters to the operation; and (3) an "rd" operation used to read a tuple from the tuple space 600, based on one or more search patterns provided as parameters to the operation. In this example, both the "in" and "rd" operations may be invoked as blocking or non-blocking operations. Additionally, it should be understood that this example is illustrative only, and that various other types and combinations of tuple-space operations may be supported in various different embodiments.

Although a tuple space 600 may be stored on a single computer server, certain embodiments described herein include distributed data tuple-spaces that are stored across multiple interconnected computing devices. As discussed below, distributed data tuple-spaces may provide potential advantages over single-server tuple spaces with respect to stability, performance, and scalability.

Figure 7:
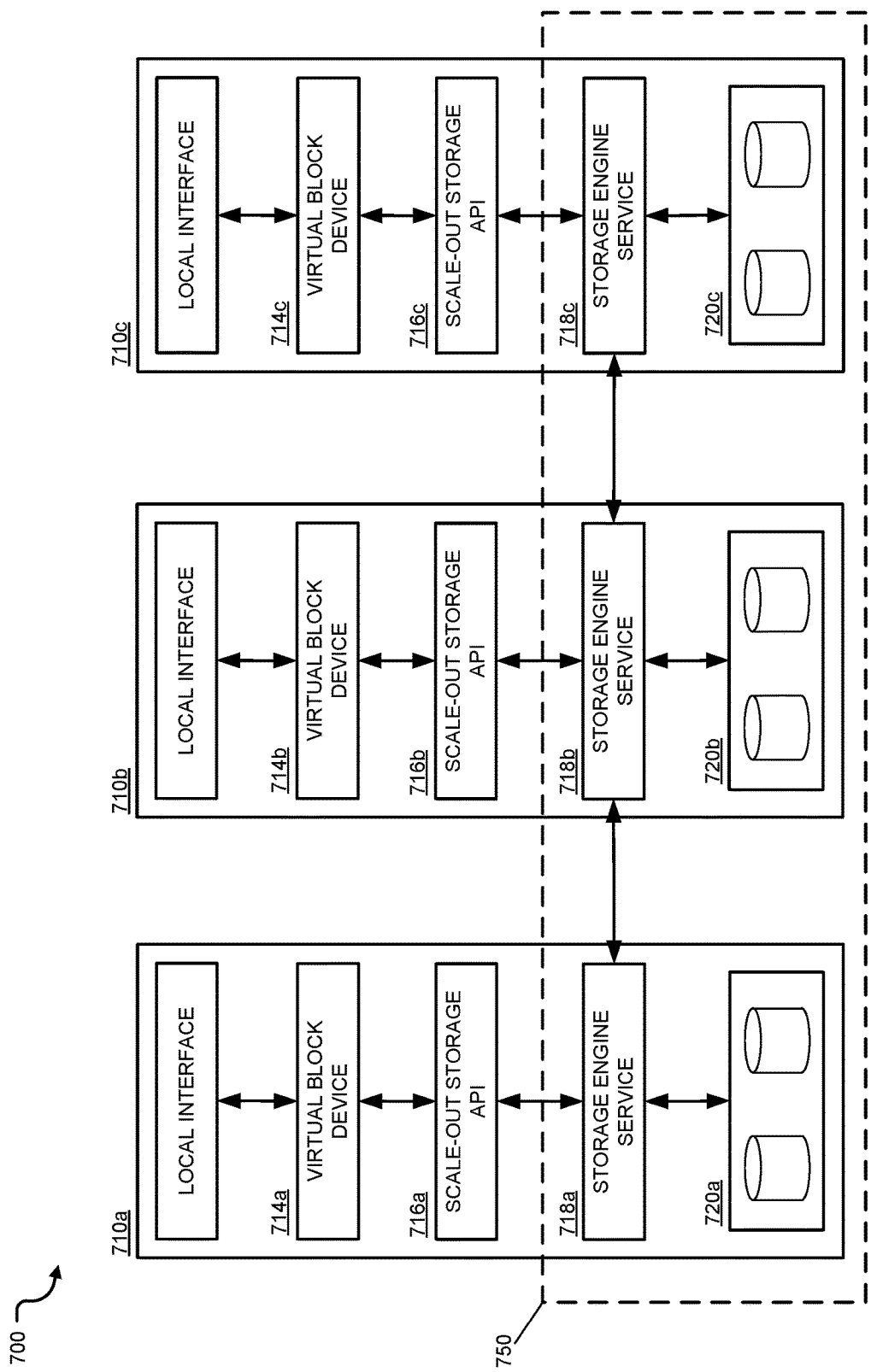
FIG. 7 is a block diagram illustrating multiple computing devices within a distributed virtual block storage network, in accordance with one or more embodiments of the disclosure.

Referring now to FIG. 7, a block diagram is shown illustrating multiple interconnected computing devices of a distributed virtual block storage network. Each computing device 710 in FIG. 7 may be similar or identical to computing device 510, discussed above. However, as shown in this example, multiple interconnected computing devices 710 may form a distributed virtual block storage network, such as distributed data tuple-space. When computing devices 710 are implemented to form a distributed data tuple-space, each computing device 710 may be referred to as a node of the tuple space. Each node 710 may operate one or more instances of a process providing access to the distributed data tuple-space, for example, the tuple-space storage engine software services 718. Nodes 710 may be interconnected and may communicate through one or more communication networks, including various network topologies (e.g., token ring, mesh, star, bus, etc.). In the distributed data tuple-space 750, each computing device node 710 may be considered to have its own local tuple space, consisting of the portion of its local physical memory dedicated to the distributed data tuple-space 750. The local tuple space of each computing device 710 may be accessed directly by the local storage engine 718 of that node 710. The particular data tuples within the distributed data tuple-space 750 that are stored remotely, in one of the other computing devices 710, may be accessed indirectly by the local storage engine 718, by transmitting requests (e.g., including a set of tuple-space operations) to the other storage engines executing on the other remote devices 710 within the distributed data tuple-space 750.

In example system 700, four separate the distributed data tuple-space 750 includes four computing devices 710. However, it should be understood that any number of node computing devices 710 may be used in other embodiments, and further that each node computing device 710 may be a generalized computer server, specialized computer server (e.g., primary storage 105, storage device 210, etc.), or may be a general-purpose or specialized computing device (e.g., workstation computer, mobile device, etc.). Further, the interconnected nodes 710 within a distributed data tuple-space may communicate directly or indirectly via one or more intermediary network components, such as network switches, network routers, gateways, firewalls, etc. Although the physical network components have not been shown in this figure so as not to obscure the other elements depicted in the figure, it should be understood that any of the network hardware components and network architecture designs may be implemented in various embodiments to support communication between the devices 710 in the system 700.

In certain embodiments, a tuple-space data model also may be utilized for data storage with unstructured data functions. To illustrate, in computer disk storage a sector may refer to a subdivision of a track on a magnetic or optical disk (e.g., a small logical block associated with a logical block address). Each sector may fix an amount of user-accessible data, for instance, 512 bytes for hard disk drives (HDDs), 2048 bytes for CD-ROMS and DVD-ROMS, and 4096 bytes for 4K sectors which are referred to as the Advanced Format by IDEMA (the International Disk Drive Equipment and Materials Association). In some cases, the amount of data required to store a row of data for a table associated with a conventional tuple space may be roughly equivalent to the sector size of an Advanced Format disk dive. Within distributed data tuple-spaces 750, the tuple-space storage engine 718 may be used to model unstructured data as a table—per each (virtual) disk drive of the virtual storage network. The 4 k Advanced format may provide various potential advantages, for example, relating to reliability, error correction, improved format efficiency by reducing the amount of space used for error correction code, etc. However, in other embodiments, different versions and/or instances of the tuple-space storage engines 718 on node devices 710 may be configured to store different sizes of data per row in a table. Thus, in some cases, sector size may be 512 byte to 4 k byte, or may range from 4 k byte to 10k byte as disk drives evolve and technology advances. Certain embodiments may support the use of different sector sizes within the physical storage of node devices 710 and/or different storage engines 718, so long as a row associated with tables of a given storage engine 718 may be configured to store an amount of data substantially equal to a sector size of a given disk drive. Additionally, solid state hard drives may be used in some cases, and may be virtualized to emulate disk drives and associated sectors. For example, in some embodiments, 512-byte sector emulation may be implemented. Specifically, 512-byte sector emulation may refer to the process of translating from the 4 k physical sectors used in Advanced Format to the older or legacy 512-byte sectors expected by a large number of computing systems. Similar types/sizes of disk drive emulation may be used in other embodiments, and such embodiments may provide certain advantages in not forcing changes to legacy computing systems that have not yet transitioned to Advanced Format.

Although data tuple-spaces might be considered separate data models and data structures from databases, they nonetheless share certain similarities and may be considered a form of a database in some cases. For example, data tuple-spaces 600 may be transactional in nature and may be configured to store data atomically. In some cases, a data tuple-space 600 may allow only one update to a particular tuple at a time. Further, tuple-space storage engines 718 may be configured to replicate the data stored in the data tuple-space. One example of a tuple-space storage engine for working with tuple-space data models that may be utilized as tuple-space storage engine 718 is MY SQL NDB CLUSTER® storage engine, or INNODB®. In some cases, the tuple-space storage engine 718 may deliver performance and scalability, and may be configured to perform data compression to shrink data objects in order to reduce the storage footprint within its physical storage 720. Further, the tuple-space storage engine 718 may be configured add or drop indexes without copying data, and also may be configured with file format management that protects upward and downward compatibility, including crash recovery to automatically finalize changes to data that were committed before the time of a crash, and may undo any changes that were in the process but not committed. Also, the tuple-space storage engine 718 may include a buffer pool to cache tables and index data as the data is indexed. As such, frequently used data may be processed directly from memory. Tuple inserts, deletes and updates (e.g., a delete followed by an insert with the updated data) may be optimized by a change buffering automatic mechanism.

In some embodiments, one or more related tuples may be considered to be tuple-space table, or may actually be combined into a table object within the tuple space 600. As an example, a tuple-space table may be created to correspond to a virtual disk drive. A tuple-space table may be created using a tuple-space storage engine 718, and may be empty at creation. Thereafter, the tuple-space table then may be loaded with rows, each row representing a logical block address for a disk drive that the table represents, and the data portion of that row being the actual data itself. Each tuple-space table may include everything needed to describe a storage disk including its content. In some embodiments, one or more individual tuple-space tables may be created at each computing device 710, to describe the physical storage disk(s) at that respective computing devices 710 that are dedicated to the data tuple-space. In some cases, such tables might not be connected, so that there are no relations between disk drives and associated tuple-space tables such that the virtual disks are separate from each other. In such cases, system 700 may be referred to as being thin provisioned, because the physical disk space 720 is not utilized until data of the tuple-space tables is actually written to disk. The data of virtual storage network 750 may be said to be "de-normalized" in such cases.

In various implementations, tuple-space storage engines 718 may support a variety of tuple-space operations (or commands) to make modifications to tuple-space data tables (and the associated physical disks 720) including, for example, INSERT (or related) operations which may function similar to a WRITE (or related) operation for writing data to disk. Using a table that functions as a virtual disk drive within a tuple-space node 710, a request may be received to write data (including a value), and the request may be translated to an API call which instructs that for a unique index of the tuple-space table, a particular value is to be inserted. Similarly, where it is desired to delete information, a tuple-space command may be utilized to say, for a particular identifier of a tuple-space table designated as a virtual drive within a node 710, that row X is to be deleted. Corresponding operations may be utilized to read data in a tuple-space table.

The data and information about a virtual disk may be stored within a particular tuple-space storage engine 718 on a node computing device 710. That is, because the present disclosure utilizes a data description language, the description of a virtual disk may be stored with the tuple-space table. A command such as DESCRIBE (or related command) may return structure and details of a given tuple-space table (and associated disk). Data description language may be made to efficiently describe a disk drive. The data model presented is able to correctly/accurately describe a disk drive and employ operations that are consistent with the way a disk drive behaves.

Additionally, using a tuple-space storage engine 718 to store of unstructured block data as disclosed may provide advantages in certain embodiments. For example, redundancy of data across nodes 710 may be included within the features inherent to the tuple-space storage engine 718. Using a tuple-space data model, compatibility with other systems also may be enhanced, because the data modeling may occurs at a lower level (e.g., the physical disk level). For instance, data stored using a particular instance of a tuple-space storage engine 718*a* may be migrated to other node systems 710-*b*-710 and/or hardware architectures 720*b*-720*d*, by communicating with other tuple-space storage engines 718*b*-718*d* in the same virtual namespace, because even different types of tuple-space storage engines 718 may be generally compatible with one another. In contrast, such data migration is not easily achievable using conventional SANs and other conventional methods of storing data. In the embodiments described herein, such data migration may be accomplished using simple software commands. Further, using device drivers such as virtual block devices 714 may impart additional advantages. For example, virtual block devices 714 may present the underlying data tuple-space as a namespace, and may eliminate the need for cumbersome hardware and software to interact with traditional networked storage. Scalability also may be enhanced in certain embodiments. For instance, rather than having to write custom code for any new storage device that may be introduced to any of the node computing devices 710 within the system 700, including server code and protocol code, the system 700 may be configured to model the disk drives 720 using data description language of the storage engines 718 that translates data to tuples. Software components may be used to store the tuple-space model's data, which may allow end users to select specific desired tuple-space storage engines 718. As a result, end users may select appropriate reliability and performance options of available tuple-space storage engines 718, rather than having to customize code when adding new storage devices 720 and/or new nodes 710 to the system 700.

Figure 8:
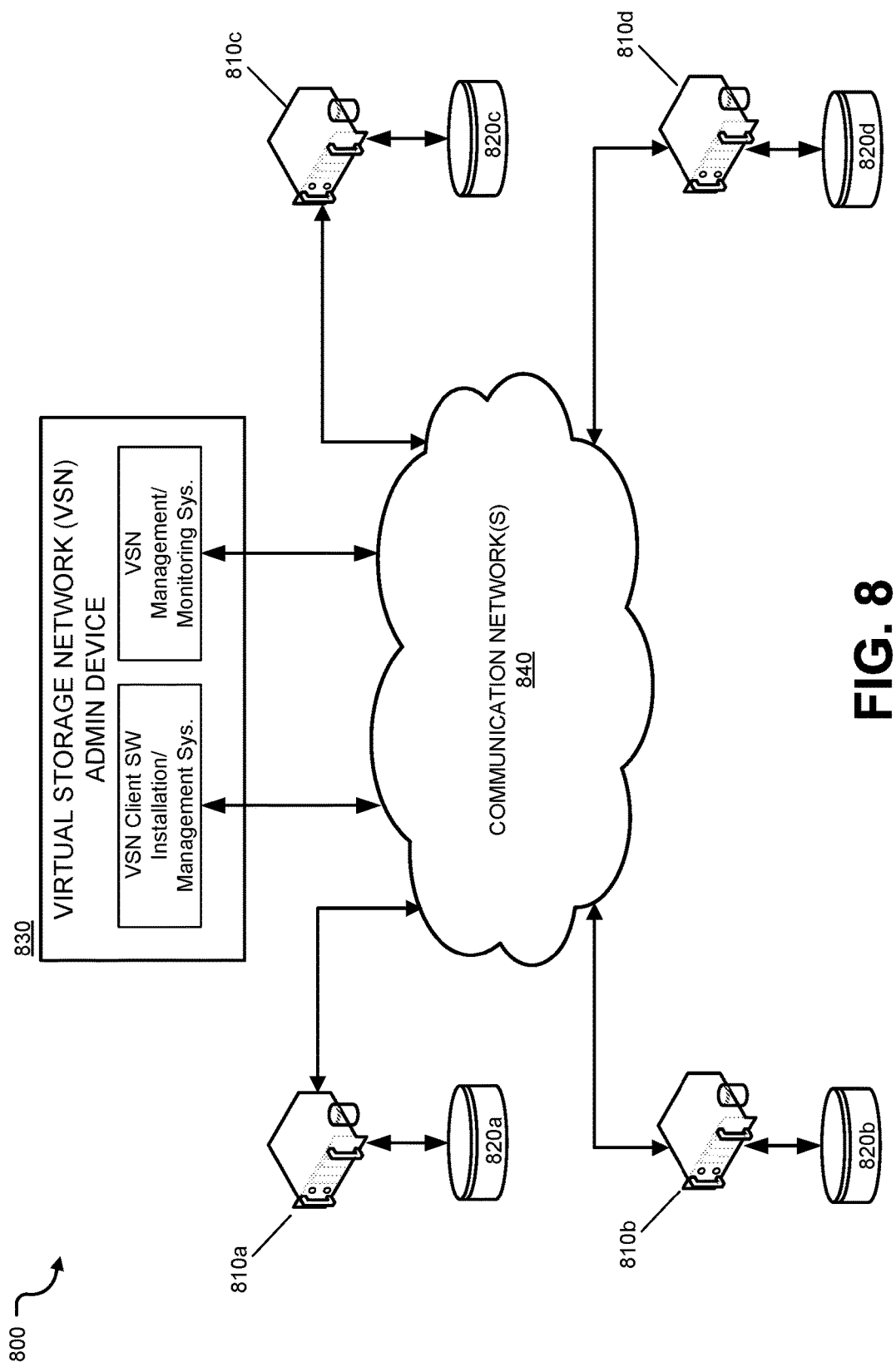
FIG. 8 is a block diagram illustrating a distributed virtual block storage network including a plurality of interconnected client devices and an administrator device, in accordance with one or more embodiments of the disclosure.

Referring now to FIG. 8, a diagram is shown illustrating a distributed virtual block storage network 800, including a plurality of interconnected client devices 810 each having physical disk storage 820, and a virtual storage network administrator device 830. In certain embodiments, the client devices 810 in this example may correspond to the node computing devices 710 and 510 described in the above examples. Thus, each client devices 810 and associated memory 820 may include some or all of the same components discussed above, such as a local file system, virtual block device, scale-out API, and tuple-space storage engine. As noted above, the devices within a data tuple-space or other virtual storage network may be interconnected using various network topologies, any of which may be implement a horizontally scaling distributed data tuple-space. In this example, every client device 810 may be connected to one or more central communication networks 840, though which it may communicate with every other client device 810. Communication network(s) 840 may include any systems capable of passing content and communications between the client devices 810, such as the Internet, a virtual private network, a local area network, a wide area network, a Wi-Fi network, a cellular network, and/or any combination thereof.

The virtual storage network administrator device 830 may be implemented on at least one of a laptop, server, mainframe, personal computer, mobile device, or the like, and may be configured to manage the client computing devices 810. In some embodiments, the administrator device 830 may be include specialized hardware and/or software components for creating and configuring the virtual storage network 800, including components for installing and managing tuple-space storage engines 718 on client device 810, and components for managing the data within the distributed data tuple-space 800, according to a tuple-space data model. In certain embodiments, the administrator device 830 may be a centralized management console.

The client computing devices 810*a*-810*d* in this example and in other embodiments may collectively define a computing environment. Any particular client device 810 may be implemented as, for example, a computer server, mainframe, personal computer, terminal, laptop, or as a storage device. In this example, each of the client devices 810 includes local storage 820. Each of the local storage devices 820*a*-820*d* may include one or more dedicated or direct-attached storage devices, such as local disk drives, local solid state drives, etc. Additionally, in some embodiments, the administrator device 830 may simply be one of the client computing devices 810.

As shown in this example, the administrator device 830 may be configured to create and manage the virtual storage network 800, which in this case may correspond to a distributed data tuple-space. In some embodiments, the administrator device 830 may include a virtual storage application. The virtual storage network 800 may include a logical partitioning created within or via a physical storage network 820*a*-820*d*, such as a storage area network (SAN). That is, physical storage 820*a*-820*d* from some or all of the client devices 810*a*-810*d* may be shared as part of the distributed data tuple-space 800. The administrator device 124 may be configured to interact with and install tuple-space storage engines 718 onto client devices 810, monitor and manage the storages of existing client devices, and uninstall tuple-space storage engines 718 for devices leaving the distributed data tuple-space 800. Thus, the virtual storage network 800 provides flexible storage capacity that can be increased or decreased over time, for example, by adding/removing physical storage devices 820, adding/removing client devices 810, and/or re-allocating the amounts of physical storages that are dedicated and available for use in the distributed data tuple-space 800.

Figure 9:
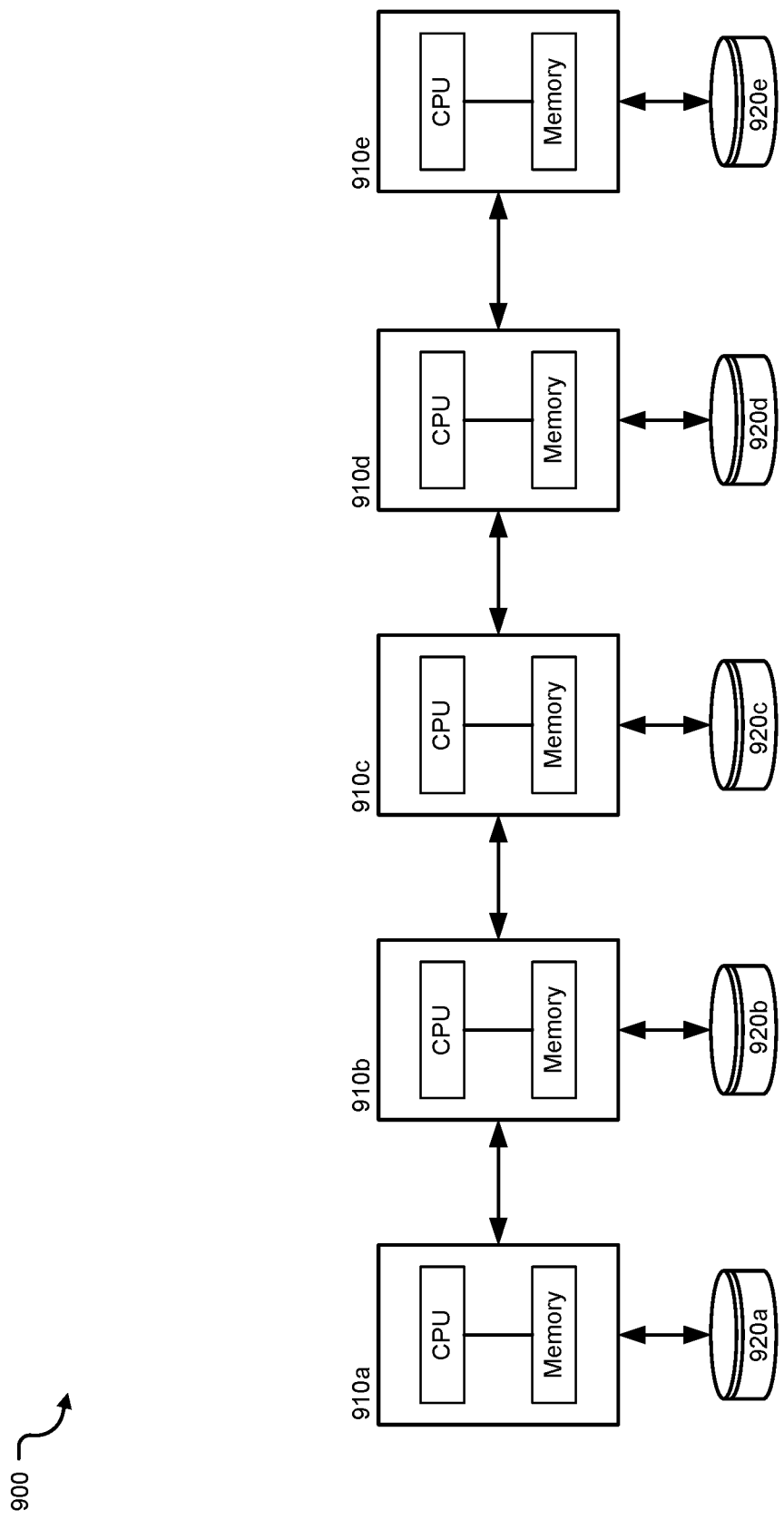
FIG. 9 is a block diagram illustrating a horizontally-scaled distributed virtual block storage network including a plurality of interconnected client devices, in accordance with one or more embodiments of the disclosure.

Referring now to FIG. 9, another diagram is shown illustrating an alternative network topology for a distributed virtual storage network 900 including a plurality of interconnected client devices 910. Similar to the example virtual storage network 800, network 900 includes a plurality of client devices 910, each having an associated physical storage 910. Like the example virtual storage network 800, the virtual storage network 900 may be implemented to provide a distributed data tuple-space 900. Specifically, using a horizontal-scaling approach, at least a portion of local storage 920 from each of the client computing devices 910 may be aggregated together (horizontally) to form the distributed data tuple-space 900. In this example, it is noted that the topology of network is different from the example virtual storage network 800, in that each node 810 is directly connected with only a subset of the other nodes 810 in the network 800.

Figure 10:
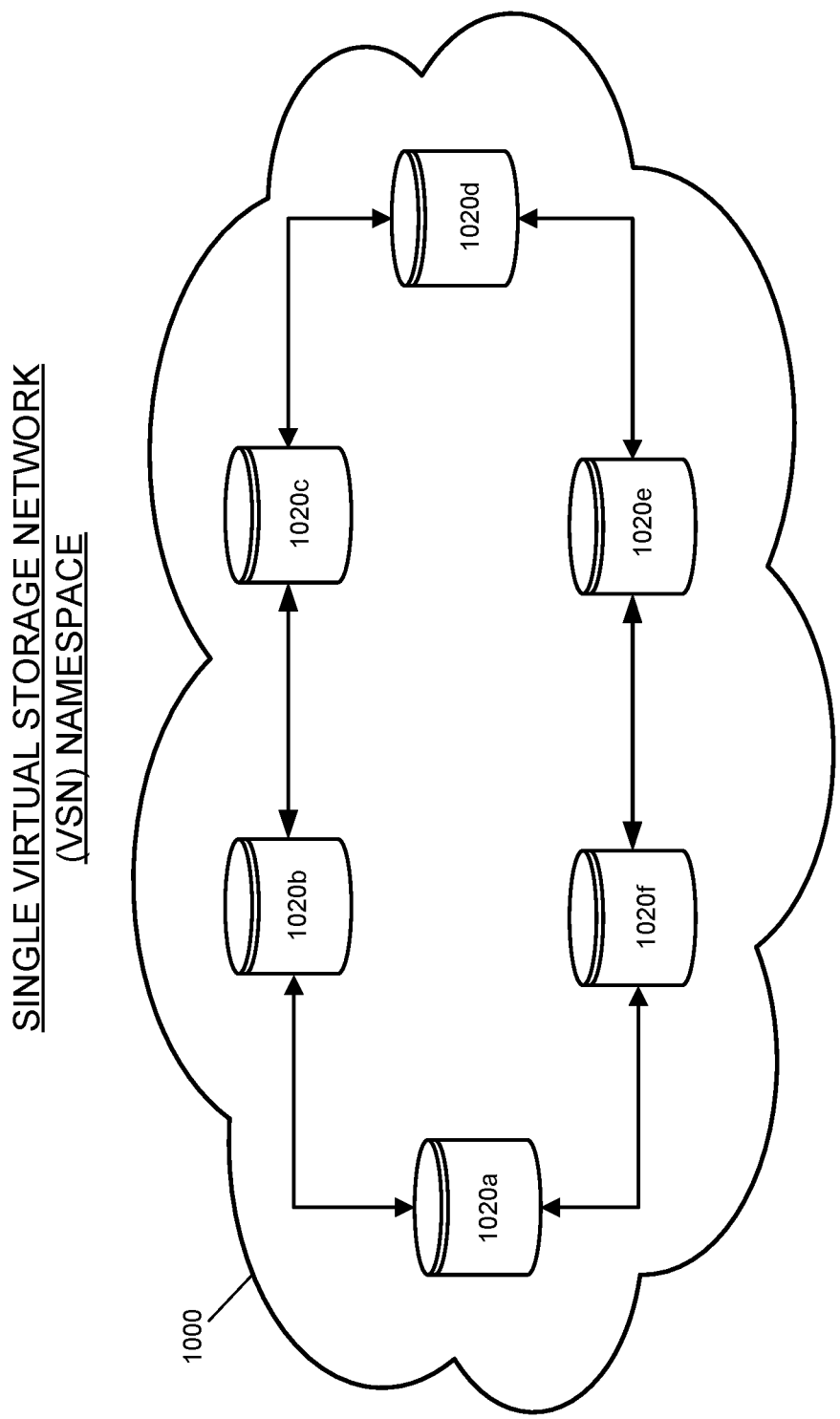
FIG. 10 is a diagram illustrating a virtual storage network exposed as a single virtual namespace, in accordance with one or more embodiments of the disclosure.

Referring now to FIG. 10, a diagram is shown illustrating a virtual storage network 1000 exposed as a single virtual namespace. The virtual namespace 1000 in this example may correspond to either of the distributed virtual storage networks 800 or 900 discussed above. As shown in this example, a number of different local physical storage devices 1020a-1020f may be aggregated together (horizontally) into the virtual storage network 1000. In this example, it is noted that the storage devices 1020a-1020f are arranged in a network topology. As noted above, the virtual storage network 1000 may be configured with various data protection protocols, such as redundancy, mirroring, and the like, to protect the data of data nodes 1020a-1020f.

Figure 11:
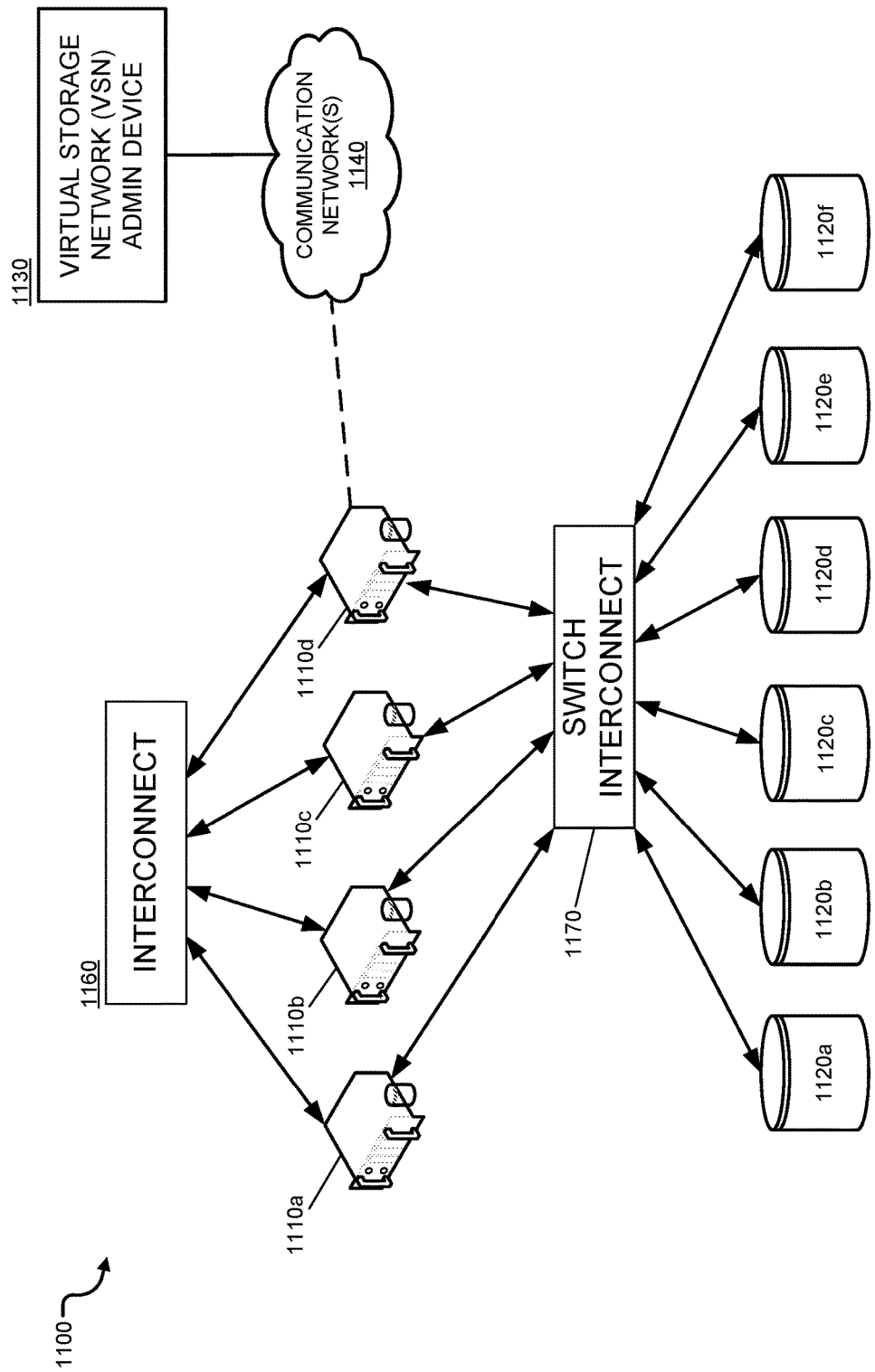
FIG. 11 is a block diagram illustrating a distributed virtual block storage network implemented as a computing cluster with a centralized management console, in accordance with one or more embodiments of the disclosure.

Referring now to FIG. 11, a block diagram is shown illustrating a distributed virtual block storage network 1100 implemented as a computing cluster with a centralized management console 1130. As noted above, in some embodiments, virtual storage network 1100 may be implemented as a computer cluster using specialized software (e.g., clusterware software) on each of the node computing devices 1110. Specifically, as shown in FIG. 11, a cluster 1100 may include one or more communication networks 1140, a centralized management console 1130 (e.g., an administrator device 1130), an interconnect 1160, a number of clustered computer servers 1110a-1110d (each of which may be similar to computing devices 710), a switch interconnect 1170, and disk subsystems 1120a-1120f (each of which may be similar to local physical storage devices 720). In this example, the clustered servers 1110 also may be the end user devices that submit requests and access data from the distributed virtual block storage network 1100. Additionally, although not shown in this example, other user devices may access the cluster 1100 through various physical platforms, such as personal computers, workstations, notebook computers, netbook computers, and mobile devices having network connectivity. Network connectivity to the cluster 1100 may be provided by physically wired connections (such as Ethernet, USB, or FireWire), or may be provided by wireless connections (such as Wi-Fi or Bluetooth®). The administrator device 1130 and/or separate end user devices may access the clustered servers 1110 via the communication network(s) 1140. The interconnect 1160 may implement, for example, a private local area network (LAN) among one or more of the clustered servers 1110. Interconnect 1160 may be used for inter-node messaging and may operate using User Datagram Protocol (UDP).

As noted above, some or all of the clustered servers 1110 may be connected to the interconnect 1160. In certain embodiment, different clustered servers 1110 may have different operating systems and/or computer hardware architectures. In other embodiments, all of the clustered servers 1110 may share a common operating system and common hardware architecture, for example, 32-bit or 64-bit. The switch interconnect 1170 may be configured to connect one or more of the clustered servers 1100 to the disk subsystem represented as the aggregation of physical storage disks 1120a-1120f. Switch interconnect 1170 may comprise hardware and/or software components configured to move data from each of one or more clustered servers 1110, to a desired disk in disk subsystem 1120. The disk subsystem 1120 may include a single disk or a plurality of physical disks, including disks having differing physical capacities, differing operating conditions, and differing manufactures. Thus, switch interconnect 1170 may be configured to permit any of the clustered servers 1100 to access any of the various types of physical disks 1120a-1120f in the disk subsystem 1120.

The distributed virtual block storage network 1100 also may be implemented using a tuple-space data model, as discussed above. In such cases, within the distributed data tuple-space cluster 1100, individual servers 1110 may be connected and disconnected, either randomly or in accordance with a predetermined schedule. Additionally, servers 1110 may be added to, or removed from, the distributed data tuple-space cluster 1100 without compromising the cluster. Similarly, individual physical disks 1120 may be added to, or removed from, disk subsystem. Due to data replication and data migration techniques implemented within the cluster 1100, the addition or removal of servers 1110 and/or the addition or removal of individual disks 1120 may be performed without losing any data and without requiring the cluster 1100 to be taken offline. In some cases, cluster servers 1110 and/or disks 1120 may be added/removed as part of planned maintenance or system upgrade processes, while in other cases the adding or removal of servers 1110 and/or disks 1120 may be unplanned and unpredictable (e.g., individual server or disk failures and recoveries, etc.). In certain embodiments, ORACLE CLUSTERWARE® software may be used to implement, monitor, and manage the cluster of computing devices 1110 and local storage 1120.

In some embodiments, the model described for building the virtual storage network 1100 using local storage 1120 may comprise non-uniform disk access. For example, in some systems, storage may be attached to only one node of a computing environment. For that node, the access is local. For all other nodes, a request for disk access or data must be forwarded by a software virtual disk layer over an interconnect to the node where the disk is locally attached. Non-uniform disk access configurations are commonly used on systems known as shared nothing or massively parallel processing (MPP) systems. If a node fails on a high availability system, then disks can be reconfigured to be local to another node. The advantages of using cluster database processing on MPP or non-uniform disk access systems are that the number of nodes is not limited by the disk connection hardware and total disk storage can be large due to the ability to flexibly add nodes.

Figure 12:
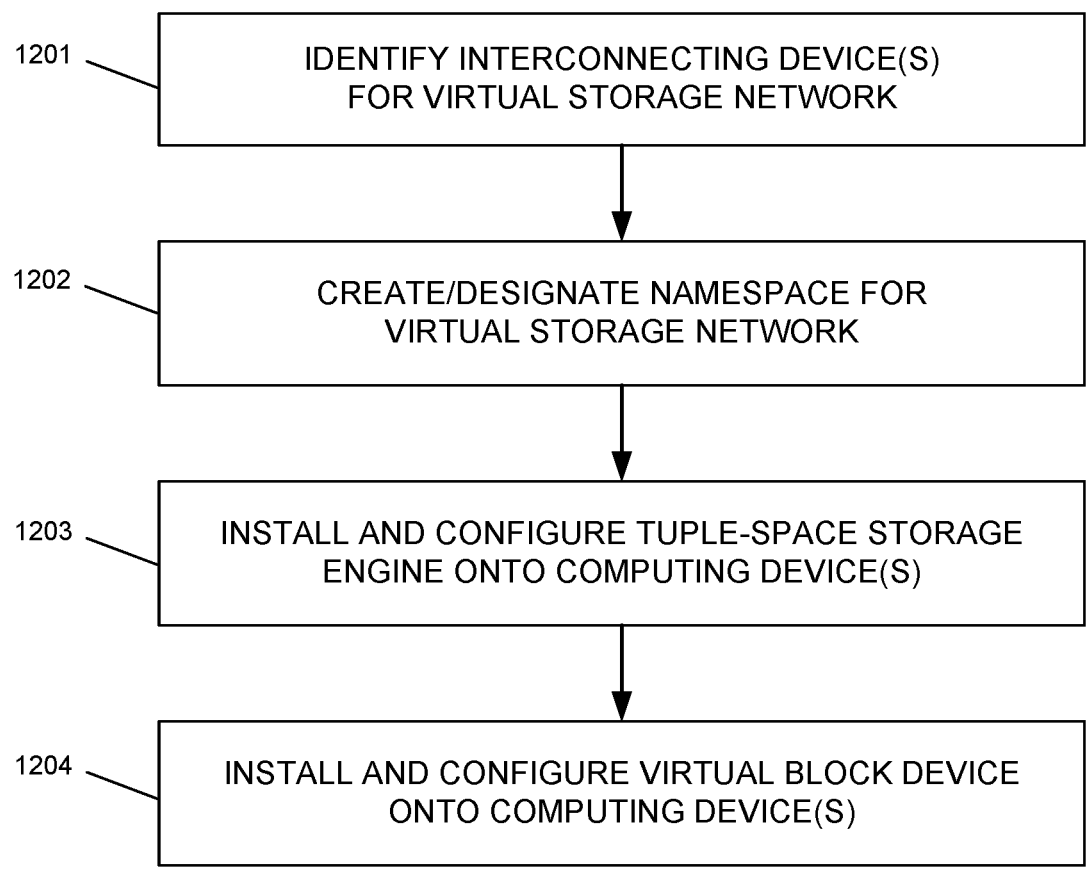
FIG. 12 is a flow diagram illustrating an example process for setting up computing devices as nodes in a distributed virtual block storage network, in accordance with one or more embodiments of the disclosure.

Referring now to FIG. 12, a flow diagram is shown for setting up computing devices as nodes in a distributed virtual block storage network. For example, the illustrative steps 1201-1204 may be used to install and configure a generic computing device or specialized server to perform as a node (e.g., 510, 710, etc.) within a distributed data tuple-space. As described below, the steps in this process may be performed by one or more devices/components in the distributed virtual block storage networks described above (e.g., network 800), such as the virtual storage network (VSN) administrator device 830 in conjunction with one or more node computing devices 710. However, it should be understood that the various features and processes described herein, including detecting and identifying interconnecting devices, creating virtual namespaces, and installing/configuring hardware and/or software components onto node computing devices, need not be limited to the specific computer systems and hardware implementations described above in FIGS. 1-11.

In step 1201, a computing device (e.g., a VSN administrator device 830) may identify one or more additional computing devices 710 to be included in virtual block storage network, such as a distributed data tuple-space 700. In some embodiments, a new server or general-purpose client computer may be connected to a communication network and may transmit a request to the administrator device 830 to join an existing distributed data tuple-space. In other cases, the administrator device 830 may identify and initiate communications with new node devices in step 1201. As described above, local physical storage 720 from the new client computer may be identified and designated to contribute to the virtual storage network 700. For example, an administrator device 830 and/or client node 710 may identify a particular subset of the physical storage devices 720 associated with the client node 710 (and/or particular sectors of those physical storage devices 720) to be contributed to the distributed data tuple-space 700, while the remaining physical storage devices 720 and sectors of the client node 710 may remain outside of the distributed data tuple-space 700. Additionally, in some examples, one or more node computing devices 710 within a distributed data tuple-space 700 might not contribute any local storage to the distributed data tuple-space 700, but may nonetheless be permitted and configured to access the network.

In step 1201, the administrator device 830 may create and/or designate a namespace for the virtual storage network 700. As noted above, a portion of the virtual storage network, as a collection of storage from local physical storage devices 720, or a storage pool, may be carved out or partitioned to form the virtual namespace. Additionally, in some embodiments, an administrator device 830 may define a plurality of namespaces corresponding to different virtual storage networks 700 that may be implemented on the same node computing devices 710 and physical storage devices 720. For instance, while only a single distributed data tuple-space 750, is shown in FIG. 7, in some examples, the same node computing devices 710 and same physical storage 720 may be used to create multiple but entirely separate distributed data tuple-spaces 750. In other examples, any of the node computing devices 710 may dedicate different portions of their local storage 720 to different distributed data tuple-spaces, and may run multiple tuple-space storage engine services 718 on the same computing device 710 to provide access to the different distributed data tuple-spaces.

As noted above, in some embodiments, the node computing devices 710 may be implemented using general purpose computing devices along with their respective local storage devices 720, instead of using specialized storage servers. In such embodiments, certain specialized hardware and software components, such as front-end initiator target connections and back-end volume managers might no longer be needed. Thus, such examples may reduce the overall costs of implementing virtual storage networks while maintaining scalability. Additionally, because the local physical storages 720a-720d co-reside with the client computing devices 710a-710d, a hyper-converged platform is created by step 1202, in which the storage devices of the distributed data tuple-space 700 reside on the end-points of the data network (e.g., the client computers in the legacy approach).

In step 1203, a tuple-space storage engine (e.g., 718) may be installed on each of the plurality of node computing devices 710, or may be otherwise utilized by administrator device 830 to configure the virtual storage network 700 to manage data according to a distributed tuple-space data model. As discussed above, the tuple-space storage engine 718 may execute as a software service on the node computing devices 718 to provide direct access to the local data tuple-space residing on the same node computing device 710, as well as providing indirect access to the remote data tuple-spaces residing on other node computing devices 710. Device-to-device communications performed by the tuple-space storage engine services 718 may be low-level communications (e.g., occurring at the physical disk level) to provide low latency access to the distributed data tuple-space. Specifically, a tuple-space data model may be used to store all client data and tuple-space storage engine 718 may be used to provide direct access to the namespace and distribute the data (e.g., synchronous replication) to the client nodes 710 within the virtual storage network 700. The tuple-space storage layer 718-720 may run on each of computing devices 710 participating in the scale-out virtual storage network 700 (e.g., the distributed data tuple-space). The tuple-space storage engine 718 may be distributed as shown in FIG. 7, meaning a portion of the engine 718 is running on multiple computing devices 710. In step 1204, a virtual block device 714 may be installed and configured on each node computing device 7100 within the virtual storage network 700. As discussed above, the virtual block devices 714 may provide access to the data within the distributed data tuple-space via a local interface (e.g., local file system).

Figure 13:
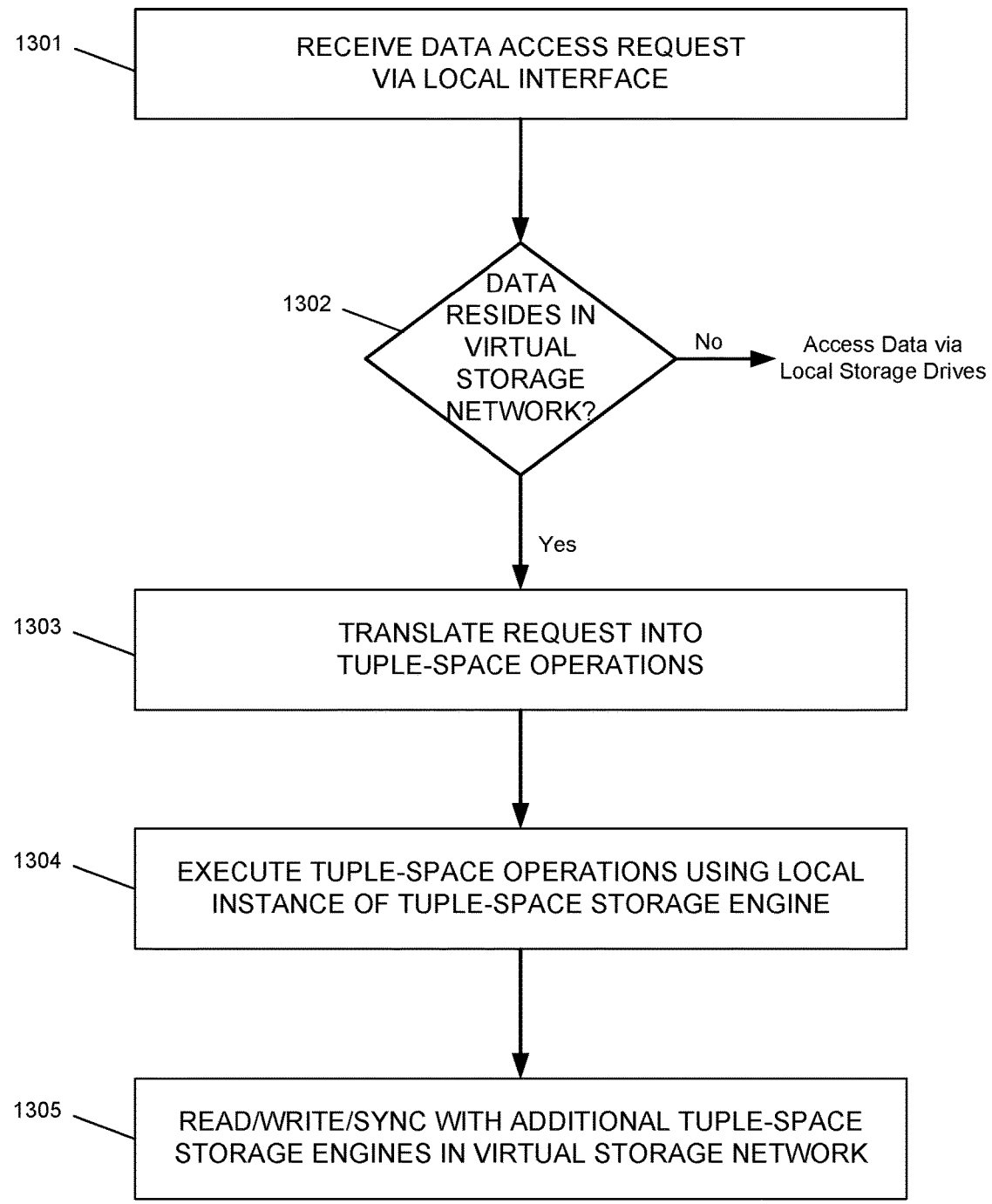
FIG. 13 is a flow diagram illustrating an example process of receiving and processing a data access request at a computing device of a distributed virtual block storage network, in accordance with one or more embodiments of the disclosure.

Referring now to FIG. 13, a flow diagram illustrating an example process of receiving and processing a data access request at a node computing device of a distributed virtual block storage network. As described below, the steps in this process may be performed by one or more devices/components in the distributed virtual block storage networks described above (e.g., network 800), such as the virtual storage network (VSN) administrator device 830 in conjunction with one or more node computing devices 710. However, it should be understood that the various features and processes described herein, including detecting and identifying interconnecting devices, creating virtual namespaces, and installing/configuring hardware and/or software components onto node computing devices, need not be limited to the specific computer systems and hardware implementations described above in FIGS. 1-11.

In step 1301, a data access request may be received by a particular node computing device 710 within a distributed data tuple-space 750. In various embodiments, the request in step 1301 may be a request to read data and/or a request to write data. The request may be received at a particular node computing device 710a, by the virtual block device 714a via the local file system 712a of the computing device 710a. As noted above, in some embodiments, the node 710a contributes a portion of its local physical storage to the distributed data tuple-space 750, while in other embodiments, the requesting node 710a might not contribute any of its local physical storage to the data tuple-space.

In step 1302, the node computing device 710 may determine whether the data to be accessed (e.g., read, retrieved, written, copied, and/or deleted) resides in the memory of the distributed data tuple-space 750, or in a separate memory system of the node computing device 710. As noted above, the virtual block device 714 may provide a local interface through which the distributed data tuple-space may be accessed. In some cases, the interface provided by the virtual block device 714 may be exposed to end users in a similar or identical manner as other data access requests received at the local file system 712, and thus the end user need not be aware of whether the requested data resides within the distributed data tuple-space or another locally accessible storage system. For example, in step 1032, the virtual block device 714 may identify one or more locations within the request, such as drive names, file share names, file path names, etc., and then determine if the locations correspond to the distributed data tuple-space 750 or another storage system. For instance, one or more local drives of the node computing device 710 may be mapped to virtual drives corresponding to one or more distributed data tuple-spaces.

If the node computing device 710 determines that the request received in step 1301 corresponds to data that is stored (or will be stored) in the distributed data tuple-space 750 (1302:Yes), then in step 1303, the node computing device 710 may translate the request into a set of tuple-space operations to be executed on the distributed data tuple-space 750. As discussed above, in some cases, a scale-out storage API 716 and/or other software components may translate data access requests received via the virtual block device 714 into tuple-space operations for the tuple-space storage engine 718. For example, depending on whether the request received in step 1301 is a request to write data, read data, copy data, delete data, etc., a series of tuple-space operations may be generated including one or more insert tuple-space operations, one or more read tuple-space operations, and/or one or more read and delete tuple-space operations. The API 716 and/or other software components also may determine when such operations are to be invoked as blocking or non-blocking operations.

In step 1304, the set of tuple-space operations determined in step 1303 may be provided to and invoked by the tuple-space storage engine 718. As discussed above, the tuple-space storage engine may be implemented as a local software service 718, and may execute on a single node computing device 710 or on multiple of the node computing devices 710. In some cases, compatible (and potential identical) instances of the tuple-space storage engine 718 may execute on each of the node computing devices 710 within the distributed data tuple-space 750. In still other examples, a tuple-space storage engine 718 may be executed within an administrator device 830 instead of, or in addition to, within the node computing devices 710.

In some cases, the execution of the tuple-space operations in step 1304 may performed entirely using the local data tuple-space residing on the same computing device node 710 on which the request was received. In such cases, step 1305 potentially need not be performed. However, in other cases, the data to be accessed within the data tuple-space may reside on a remote node. Additionally, the data request may involve multiple tuples, some of which may be stored locally and others stored remotely within the distributed data tuple-space 750. Additionally, using data replication/duplication techniques, some particular data (e.g., individual data tuples) may be replicated and stored within the physical storage of multiple node computing devices 710. Accordingly, in step 1304, the tuple-space storage engine 718 may directly access the local data tuple-space, and/or in step 1305 may communicate with the other tuple-space storage engines 718 executing on the remote node computing devices 710 to perform the determined tuple-space operations. As noted above, the communications between the tuple-space storage engines 718 may be low-level (e.g., occurring at the physical disk level) and thus may provide low latency access to the distributed data tuple-space 750.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A distributed storage system, comprising:
   a first computing device, comprising:
      one or more network interfaces;
      a first processing unit comprising one or more processors;
      a first physical computer storage unit comprising one or more physical disk drives;
      a first virtual block device configured to provide a local interface to the first physical computer storage unit; and
      memory coupled with and readable by the processing unit and storing therein a set of instructions which, when executed by the first processing unit, causes the first computing device to:
         execute a first software service configured to provide access to a distributed data tuple-space, wherein the first physical computer storage unit stores a first portion of the distributed data tuple-space and separate local storage not within the distributed data tuple-space, and wherein one or more additional portions of the distributed data tuple-space are stored in one or more remote computing devices;
         receive a first request via a local file system of the first computing device, to access a first particular data stored within the physical computer storage unit of the first computing device;
         determine, based on a first data identifier within the first request, whether the first particular data is accessible via the distributed data tuple-space or is accessible via a separate local storage system not within the distributed data tuple-space;
         in response to determining that the first particular data is accessible via the distributed data tuple-space;
            (a) process the first request via the first virtual block device of the first computing device, the first virtual block device configured to provide an interface identical to the local file system;
            (b) translate, by a scaled-out storage application programming interface (API) of the first computing device, the first request into a first set of one or more tuple-space operations compatible with the distributed data tuple-space; and
            (c) execute the first set of tuple-space operations, using the first software service configured to provide access to the distributed data tuple-space, wherein executing of the set of tuple-space operations by the software service comprises:
               (i) determine whether the first portion of the distributed data tuple-space stored in the first physical computer storage unit is designated to store the first particular data;
               (ii) in response to determining that the first portion of the distributed data tuple-space is designated to store the particular data, executing the set of tuple-space operations on the first computing device;
               (iii) determine whether at least one of the additional portions of the distributed data tuple-space stored in the one or more remote computing devices are designated to store the first particular data; and
               (iv) in response to determining that at least one of the remote computing devices is designated to store the first particular data, transmit a request to at least one additional software service providing access to the distributed data tuple-space, the at least one additional software service executing on the at least one of the remote computing devices designated to store the first particular data; and
   a second computing device, comprising:
      one or more network interfaces;
      a second processing unit comprising one or more processors;
      a second physical computer storage unit comprising one or more physical disk drives;
      a second virtual block device configured to provide a local interface to the second physical computer storage unit; and
      memory coupled with and readable by the processing unit and storing therein a set of instructions which, when executed by the second processing unit, causes the second computing device to:
         execute a second software service configured to provide access to the distributed data tuple-space, wherein the second physical computer storage unit stores a second portion of the distributed data tuple-space;

receive, a second request, via a local file system of second computing device, to access a second particular data within the distributed data tuple-space;

determine, based on a second data identifier within the second request, whether the second particular data is accessible via the distributed data tuple-space or is accessible via a separate local storage system not within the distributed data tuple-space;

in response to determining that the second particular data is accessible via the distributed data tuple-space;

(a) process the second request via the second virtual block device of the second computing device, the second virtual block device configured to provide an interface identical to the local file system;

(b) translate, by a scaled-out storage application programming interface (API) of the second computing device, the second request into a second set of one or more tuple-space operations compatible with the distributed data tuple-space; and (c) execute the second set of tuple-space operations, using the second software service configured to provide access to the distributed data tuple-space, wherein executing of the set of tuple-space operations by the software service comprises:

(i) determine whether the second portion of the distributed data tuple-space stored in the second physical computer storage unit is designated to store the second particular data;

(ii) in response to determining that the second portion of the distributed data tuple-space is designated to store the particular data, executing the set of tuple-space operations on the second computing device;

(iii) determine whether at least one of the additional portions of the distributed data tuple-space stored in the one or more remote computing devices are designated to store the second particular data; and (iv) in response to determining that at least one of the remote computing devices is designated to store the second particular data, transmit a request to at least one additional software service providing access to the distributed data tuple-space, the at least one additional software service executing on the at least one of the remote computing devices designated to store the second particular data.

2. The distributed storage system of claim 1, wherein the first request to access the first particular data within the distributed data tuple-space is received via a local file system interface provided by the first virtual block device.

3. The distributed storage system of claim 1, wherein both the first portion of the distributed data tuple-space stored in the first physical computer storage unit, and the second portion of the distributed data tuple-space stored in the second physical computer storage unit are designated by the first software service and the second software service to store the first particular data.

4. The distributed storage system of claim 3, wherein the first software service executing on the first computing device and the second software service executing on the second computing device to store the second particular data correspond to first and second instances of an identical tuple-space software storage engine.

5. The distributed storage system of claim 4, the memory of the first computing device storing additional instructions which, when executed by the first processing unit, causes the first computing device to:

receive a first transmission from a third instance of the tuple-space software storage engine executing on a third computing device; and in response to the first transmission, update application memory within the first computing device associated with the execution of the first instance of the tuple-space software storage engine, to indicate that the third computing device is included in the distributed data tuple-space.

6. The distributed storage system of claim 5, the memory of the first computing device storing additional instructions which, when executed by the first processing unit, causes the first computing device to:

receive a second transmission from the third instance of the tuple-space software storage engine executing on the third computing device; and in response to the second transmission, update the application memory within the first computing device associated with the execution of the first instance of the tuple-space software storage engine, to indicate that the third computing device is no longer included in the distributed data tuple-space.

7. The distributed storage system of claim 1, wherein the first software service and the second software service are configured to distribute the data within the distributed data tuple-space using synchronous replication.

8. The distributed storage system of claim 1, wherein the first particular data and the second particular data are unstructured data.

9. The distributed storage system of claim 1, wherein the translation of the first request into the first set of tuple-space operations compatible with the distributed data tuple-space first software service comprises translating a local file system command within the first request into a combination of the following commands:

an insert tuple-space operation;
a read tuple-space operation; and
a read and delete tuple-space operation.

10. The distributed storage system of claim 1, wherein the physical disk drives of the first physical computer storage unit in the first computing device have a different disk sector format than the physical disk drives of the second physical computer storage unit in the second computing device.

11. The distributed storage system of claim 1, wherein the first software service and the second software service are separate instances of compatible computer clustering software.

12. The distributed storage system of claim 1, the memory of the first computing device storing additional instructions which, when executed by the first processing unit, causes the first computing device to:

generate a first index within the distributed data tuple-space; and remove a second index within the distributed data tuple-space, wherein generating the first index and removing the second index does not require copying data within the distributed data tuple-space.

13. A method comprising:

executing, by a first computing device, a software service configured to provide access to a distributed data tuple-space, wherein a physical computer storage unit of the first computing device stores a first portion of the distributed data tuple-space and separate local storage not within the distributed data tuple-space, and wherein one or more additional portions of the distributed data tuple-space are stored in one or more remote computing devices;

receiving, by the first computing device, a request, via a local file system of the first computing device, to access a particular data stored within the physical computer storage unit of the first computing device;

determining, based on a data identifier within the request, whether the particular data is accessible via the distributed data tuple-space or is accessible via the separate local storage system not within the distributed data tuple-space; and in response to determining that the particular data is accessible via the distributed data tuple-space:
  (a) processing the request via a virtual block device of the first computing device, the virtual block device configured to provide an interface identical to the local file system;
  (b) translating, by a scaled-out storage application programming interface (API) of the first computing device, the request into a set of one or more tuple-space operations compatible with the distributed data tuple-space; and
  (c) executing the set of tuple-space operations, using the software service configured to provide access to the distributed data tuple-space, wherein executing of the set of tuple-space operations by the software service comprises:
    (i) determining whether the first portion of the distributed data tuple-space stored in the physical computer storage unit of the first computing device is designated to store the particular data;
    (ii) in response to determining that the first portion of the distributed data tuple-space is designated to store the particular data, executing the set of tuple-space operations on the first computing device,
    (iii) determining whether at least one of the additional portions of the distributed data tuple-space stored in one or more remote computing devices are designated to store the particular data; and
    (iv) in response to determining that at least one of the remote computing devices is designated to store the particular data, transmit a request to at least one additional software service providing access to the distributed data tuple-space, the at least one additional software service executing on the at least one of the remote computing devices designated to store the particular data.

14. The method of claim 13, wherein the first portion of the distributed data tuple-space stored in the physical computer storage unit of the first computing device, and a second portion of the distributed data tuple-space stored on a second remote computing device, are both designated to store the particular data, and wherein the software service executing on the first computing device is an instance of a tuple-space software storage engine which is identical to a second instance of the tuple-space software storage engine executing on the second remote computing device.

15. The method of claim 14, further comprising:
receiving a first transmission from a third instance of the tuple-space software storage engine executing on a third computing device; and in response to the first transmission, updating application memory within the first computing device associated with the execution of the instance of the tuple-space software storage engine, to indicate that the third computing device is included in the distributed data tuple-space.

16. The method of claim 15, further comprising:
receiving a second transmission from the third instance of the tuple-space software storage engine executing on the third computing device; and in response to the second transmission, updating the application memory within the first computing device associated with the execution of the instance of the tuple-space software storage engine, to indicate that the third computing device is no longer included in the distributed data tuple-space.

17. A computing device, comprising:
one or more network interfaces;
a processing unit comprising one or more processors;
a physical computer storage unit comprising one or more physical disk drives;
a virtual block device configured to provide a local interface to the physical computer storage unit; and
memory coupled with and readable by the processing unit and storing therein a set of instructions which, when executed by the processing unit, causes the computing device to:
  execute a software service configured to provide access to a distributed data tuple-space, wherein the physical computer storage unit of the computing device stores a first portion of the distributed data tuple-space and separate local storage not within the distributed data tuple-space, and wherein one or more additional portions of the distributed data tuple-space are stored in one or more remote computing devices;
  receive a request, via a local file system of the computing device, to access a particular data stored within the physical computer storage unit of the computing device;
  determine, based on a data identifier within the request, whether the particular data is accessible via the distributed data tuple-space or is accessible via a separate local storage system not within the distributed data tuple-space; and
  in response to determining that the particular data is accessible via the distributed data tuple-space:
    (a) process the request via a virtual block device of the computing device, the virtual block device configured to provide an interface identical to the local file system;
    (b) translate, by a scaled-out storage application programming interface (API) of the computing device, the request into a set of one or more tuple-space operations compatible with the distributed data tuple-space; and
    (c) execute the set of tuple-space operations using the software service configured to provide access to the distributed data tuple-space, wherein executing of the set of tuple-space operations by the software service comprises:
      (i) determining whether the first portion of the distributed data tuple-space stored in the physical computer storage unit of the computing device is designated to store the particular data;
      (ii) in response to determining that the first portion of the distributed data tuple-space is designated to store the particular data, executing the set of tuple-space operations on the computing device;

(iii) determining whether at least one of the additional portions of the distributed data tuple-space stored in one or more remote computing devices are designated to store the particular data; and (iv) in response to determining that at least one of the remote computing devices is designated to store the particular data, transmit a request to at least one additional software service providing access to the distributed data tuple-space, the at least one additional software service executing on the at least one of the remote computing devices designated to store the particular data.

18. The computing device of claim 17, wherein the first portion of the distributed data tuple-space stored in the physical computer storage unit of the computing device, and a second portion of the distributed data tuple-space stored on a second remote computing device, are both designated to store the particular data, and wherein the software service executing on the computing device is an instance of a tuple-space software storage engine which is identical to a second instance of the tuple-space software storage engine executing on the second remote computing device.

19. The computing device of claim 17, wherein the physical disk drives of the first physical computer storage unit in the computing device have a different disk sector format than the physical disk drives of the second physical computer storage unit in the second remote computing device.

20. The computing device of claim 17, the memory storing further instructions which, when executed by the processing unit, causes the computing device to:

receive a transmission from a third instance of the tuple-space software storage engine executing on a third computing device; and in response to the transmission, update application memory within the computing device associated with the execution of the instance of the tuple-space software storage engine, to indicate that the third computing device is included in the distributed data tuple-space.

\* \* \* \* \*

UNITED STATES PATENT AND TRADEMARK OFFICE
CERTIFICATE OF CORRECTION

PATENT NO. : 10,275,179 B2
APPLICATION NO. : 15/407058
DATED : April 30, 2019
INVENTOR(S) : Petrocelli Page 1 of 1

It is certified that error appears in the above-identified patent and that said Letters Patent is hereby corrected as shown below:

In the Claims

In Column 23, Line 64, in Claim 1, delete "request" and insert -- request, --, therefor.

In Column 24, Line 8, in Claim 1, delete "space;" and insert -- space: --, therefor.

In Column 25, Line 1, in Claim 1, delete "receive," and insert -- receive --, therefor.

In Column 25, Line 12, in Claim 1, delete "space;" and insert -- space: --, therefor.

In Column 27, Line 41, in Claim 13, delete "device," and insert -- device; --, therefor.

Signed and Sealed this
Twenty-first Day of July, 2020

Andrei Iancu
*Director of the United States Patent and Trademark Office*